US012523096B2

(12) United States Patent
Russell et al.

(10) Patent No.: US 12,523,096 B2
(45) Date of Patent: Jan. 13, 2026

(54) TOP CAP FOR ARTICULATING LADDER

(71) Applicant: LITTLE GIANT LADDER SYSTEMS, LLC, Springville, UT (US)

(72) Inventors: Brian B. Russell, Saratoga Springs, UT (US); N. Ryan Moss, Mapleton, UT (US); Steven S. Miner, Springville, UT (US)

(73) Assignee: LITTLE GIANT LADDER SYSTEMS, LLC, Springville, UT (US)

( * ) Notice: Subject to any disclaimer, the term of this patent is extended or adjusted under 35 U.S.C. 154(b) by 969 days.

(21) Appl. No.: 17/589,418

(22) Filed: Jan. 31, 2022

(65) Prior Publication Data

US 2022/0243532 A1 Aug. 4, 2022

Related U.S. Application Data

(60) Provisional application No. 63/144,332, filed on Feb. 1, 2021.

(51) Int. Cl.
*E06C 7/14* (2006.01)
*E06C 1/18* (2006.01)

(52) U.S. Cl.
CPC . *E06C 7/14* (2013.01); *E06C 1/18* (2013.01)

(58) Field of Classification Search
CPC ... E06C 1/18; E06C 1/39; E06C 1/393; E06C 7/14; E06C 7/16; E06C 7/165
See application file for complete search history.

(56) References Cited

U.S. PATENT DOCUMENTS 1,587,383 A * 6/1926 Kennett .................... E06C 1/32 182/24
2,899,011 A * 8/1959 Babits ..................... E06C 7/165 182/120
(Continued)

FOREIGN PATENT DOCUMENTS

EP 0360049 B1 3/1993
FR 2970027 A1 * 7/2012 ............... E06C 1/16
(Continued)

OTHER PUBLICATIONS

International Search Report and Written Opinion for International Application No. PCT/US2022/014600 dated Jun. 6, 2022.
(Continued)

*Primary Examiner* — Colleen M Chavchavadze
(74) *Attorney, Agent, or Firm* — Dorsey & Whitney LLP

(57) ABSTRACT

Ladders and ladder accessories for articulating ladders are mountable to an upper rung of the ladder and can remain attached to the upper rung while the ladder articulates between collapsed, straight, and step ladder configurations without binding or engaging other rungs. The accessories can be top caps configured to hold tools and parts while the user climbs and stands on the ladder. The accessories can be removed from the ladder without damage to the accessory or the ladder, thereby enabling retrofitting ladders with the accessory or moving the accessory to different rungs or positions on the same ladder. Some accessories can have more than one body portion, and a portion can therefore pivot relative to another portion to enlarge the working platform offered by the accessory and to provide additional surfaces for temporarily supporting the accessory parts on the ladder rungs.

21 Claims, 29 Drawing Sheets

(56) References Cited

U.S. PATENT DOCUMENTS

| | | | | | |
|---|---|---|---|---|---|
| 3,020,972 | A * | 2/1962 | Hockett | B62B 3/00 | 182/120 |
| 3,078,950 | A * | 2/1963 | Schramm | E06C 7/165 | 182/120 |
| 3,422,923 | A * | 1/1969 | Lund | E06C 7/14 | 182/20 |
| 3,642,239 | A * | 2/1972 | Zeiler, Jr. | E06C 7/14 | 248/912 |
| 4,210,224 | A | 7/1980 | Kummerlin et al. | | |
| 4,258,827 | A | 3/1981 | Klose | | |
| 4,407,045 | A | 10/1983 | Boothe | | |
| 5,056,620 | A | 10/1991 | Zumwalt et al. | | |
| 5,511,753 | A * | 4/1996 | Lage | E06C 7/14 | 220/737 |
| 5,673,885 | A * | 10/1997 | Pham | E06C 7/14 | 248/210 |
| 5,913,380 | A | 6/1999 | Gugel et al. | | |
| 6,698,548 | B1 * | 3/2004 | Verrill | E06C 7/14 | 248/238 |
| 6,786,300 | B1 * | 9/2004 | Bonifacini | E06C 7/165 | 182/120 |
| 7,032,711 | B1 * | 4/2006 | Katz | B25H 3/06 | 248/238 |
| 7,207,438 | B2 * | 4/2007 | Lieffring | B25H 3/06 | 108/143 |
| 8,186,481 | B2 | 5/2012 | Moss et al. | | |
| 8,701,828 | B1 | 4/2014 | Matthew | | |
| 9,016,434 | B2 | 4/2015 | Moss et al. | | |
| 9,422,767 | B2 * | 8/2016 | Russell | E06C 1/16 | |
| 9,797,194 | B2 | 10/2017 | Moss et al. | | |
| 10,138,680 | B2 * | 11/2018 | Williams | E06C 7/14 | |
| 10,221,625 | B1 * | 3/2019 | Bernhard, Jr. | E06C 7/14 | |
| 10,358,832 | B1 | 7/2019 | Wagner | | |
| 10,501,990 | B2 | 12/2019 | Moss et al. | | |
| 10,597,941 | B2 | 3/2020 | Moss et al. | | |
| 10,801,261 | B2 | 10/2020 | Peterson et al. | | |
| 11,167,407 | B2 * | 11/2021 | McGee | B25H 3/02 | |
| 11,187,038 | B2 * | 11/2021 | Textor | E06C 7/165 | |
| 2005/0247838 | A1 * | 11/2005 | Zodnik | E06C 7/14 | 248/238 |
| 2005/0258002 | A1 * | 11/2005 | Sabo | E06C 7/14 | 182/129 |
| 2009/0229918 | A1 | 9/2009 | Moss et al. | | |
| 2013/0256481 | A1 | 10/2013 | Saucier | | |
| 2017/0014989 | A1 * | 1/2017 | McGee | B25H 1/0021 | |
| 2019/0145171 | A1 * | 5/2019 | Frensley | E06C 7/165 | 182/120 |
| 2019/0234144 | A1 | 8/2019 | Badowski | | |
| 2019/0376341 | A1 | 12/2019 | Maxfield et al. | | |
| 2022/0106836 | A1 | 4/2022 | Miner et al. | | |

FOREIGN PATENT DOCUMENTS

| | | | |
|---|---|---|---|
| KR | 200146389 | Y1 | 6/1999 |
| WO | 2018148192 | A1 | 8/2018 |

OTHER PUBLICATIONS

Combined Search and Examination Report under Sections 17 and 18(3) in GB2415341.3, dated Nov. 21, 2024.

Examination Report under Section 18(3) in GB2312195.7, dated Nov. 21, 2024.

Australia Patent Application No. 2022213427, Examination Report No. 1, dated Aug. 18, 2025.

* cited by examiner

TOP CAP FOR ARTICULATING LADDER

CROSS-REFERENCE TO RELATED APPLICATIONS

This application claims the benefit of U.S. Provisional Patent Application No. 63/144,332, filed on 1 Feb. 2021, the disclosure of which is incorporated, in its entirety, by this reference.

BACKGROUND

Ladders are conventionally utilized to provide a user thereof with improved access to elevated locations that might otherwise be inaccessible. Ladders come in many shapes and sizes, such as straight ladders, extension ladders, step ladders, and combination step and extension ladders. So-called combination ladders (sometimes referred to as articulating ladders) may incorporate, in a single ladder, many of the benefits of multiple ladder designs.

Straight ladders, extension ladders or combination ladders (when configured as straight or an extension ladder), are ladders that are conventionally positioned against an elevated surface, such as a wall or the edge of a roof, to support the ladder at a desired angle. A user then ascends the ladder to obtain access to an elevated area, such as to an upper area of the wall or access to the roof. A pair of feet or pads, one being coupled to the bottom of each side rail, is conventionally used to engage the ground, a floor or some other supporting surface.

Step ladders and combination ladders (when configured as a step ladder) are generally considered to be self-supporting in that they include a first rail assembly which includes steps or rungs that is coupled to a second rail assembly or other support structure. The first and second rail assemblies are typically positioned at an acute angle relative to each other so that there are multiple feet or support members—at least three, but typically four—to support the ladder in a free standing position. Thus, the ladder may be used without the need to lean the ladder against a wall or other vertical support structure.

Conventional step ladders include a top cap that may be configured to hold or store supplies and tools. However, combination ladders lack such a top cap for use when they are in a step ladder configuration. While some accessories have been provided in an effort for a user to have a place to store or hole supplies or tools while standing on a combination ladder, such accessories are conventionally removable so that they don't interfere with use of the ladder while in a different state (e.g., when the ladder transitions to an extension state from a step ladder state).

There is a continuing desire in the industry to provide improved functionality of ladders while maintaining or improving the safety and stability of such ladders.

SUMMARY

Aspects of the present disclosure relate to a ladder, comprising a first rail assembly comprising: a first pair of inner rails and a first pair of outer rails, with the pair of inner rails being slidably disposed in a upper portion of pair of outer rails; a first plurality of inner rungs coupled between the first pair of inner rails; and a second plurality of outer rungs coupled between the first pair of outer rails; a second rail assembly hingedly coupled with the first rail assembly and comprising: a second pair of inner rails and a second pair of outer rails, with the pair of inner rails being slidably disposed in an upper portion of the pair of outer rails; a first plurality of inner rungs coupled between the second pair of inner rails; and a second plurality of outer rungs coupled between the second pair of outer rails; and a top cap cantilevered from an uppermost rung of the first plurality of inner rungs.

In some embodiments, the top cap can include a main body and at least one bracket coupled with the main body. The main body can include a protrusion defining a first groove, and a first edge of the uppermost rung is positioned within the first groove. The at least one bracket can define a second groove, and a second edge of the uppermost rung can be positioned within the second groove. A portion of the at least one bracket can abut against a central body portion of the uppermost rung. The uppermost rung can include a first tread portion and a second tread portion, and wherein the top cap can be clamped to the first tread portion. The first assembly and the second assembly can be selectively lockable in at least three different positions relative to each other. The first assembly and the second assembly can be selectively movable between a collapsed position and a step ladder position, and a gap can be defined between a cantilevered edge of the top cap and an uppermost rung of the second plurality of inner rungs when the first and second assemblies are in the step ladder position. The first assembly and the second assembly can be selectively movable between a collapsed position and a step ladder position, and wherein, when the ladder is in the collapsed position, the top cap can be positioned between a first plane extending through the face surfaces of the first plurality of outer rungs and a second plane extending through face surfaces of the second plurality of outer rungs.

Another aspect of the disclosure relates to a ladder, comprising: a first pair of rails, at least one rail of the first pair of rails having a base end and a top end; a first plurality of rungs coupled between the first pair of rails; a second pair of rails, at least one rail of the second pair of rails having a top end, the top end being pivotally joined to the top end of the at least one rail of the first pair of rails; a second plurality of rungs coupled between the second pair of rails; and a tray mounted to a rung of the first plurality of rungs, wherein the tray is positioned between the base end and the top end of the at least one rail of the first pair of rails.

The tray can be positioned out of contact with all other rungs of the first plurality of rungs and the second plurality of rungs. The rung can be positioned nearest to the at least one hinge of all of the first plurality of rungs. The tray can be reversibly releasable from the rung. The rung can include a first tread surface, wherein the tray has a lower surface contacting the first tread surface.

In another aspect of the disclosure, a ladder accessory is provided, comprising: a first body portion having an upper surface, a lower surface, and a protrusion extending from the lower surface; a bracket member coupled with the first body portion and extending away from the lower surface of the first body portion, the bracket member being at least partially repositionable relative to the first body portion; wherein a first recess opening is at least partially defined by the protrusion and opens in a first direction extending substantially parallel to the lower surface; and wherein a second recess opening is at least partially defined by the bracket member and opens in a second direction extending substantially parallel to the lower surface, the second direction facing toward the first direction.

In some embodiments, the protrusion can define a bottom wall of the first recess opening, and the bracket member can define a bottom wall of the second recess opening. The bracket member can be reversibly releasable from the first body portion. The bracket member can be attached to the first body portion using a reversibly releasable fastener. In some embodiments, the ladder accessory can further comprise a second body portion pivotally mounted to the first body portion and movable between a first position covering the upper surface of the first body portion and a second position extending away from the upper surface of the first body portion. The first body portion can comprise a first aperture extending through the upper and lower surfaces, and a second aperture extends through the second body portion and forms a channel through the ladder accessory when the second body portion is in the first position.

BRIEF DESCRIPTION OF THE DRAWINGS

The foregoing and other advantages of the invention will become apparent upon reading the following detailed description and upon reference to the drawings in which.

DETAILED DESCRIPTION OF THE INVENTION

Figure 1:
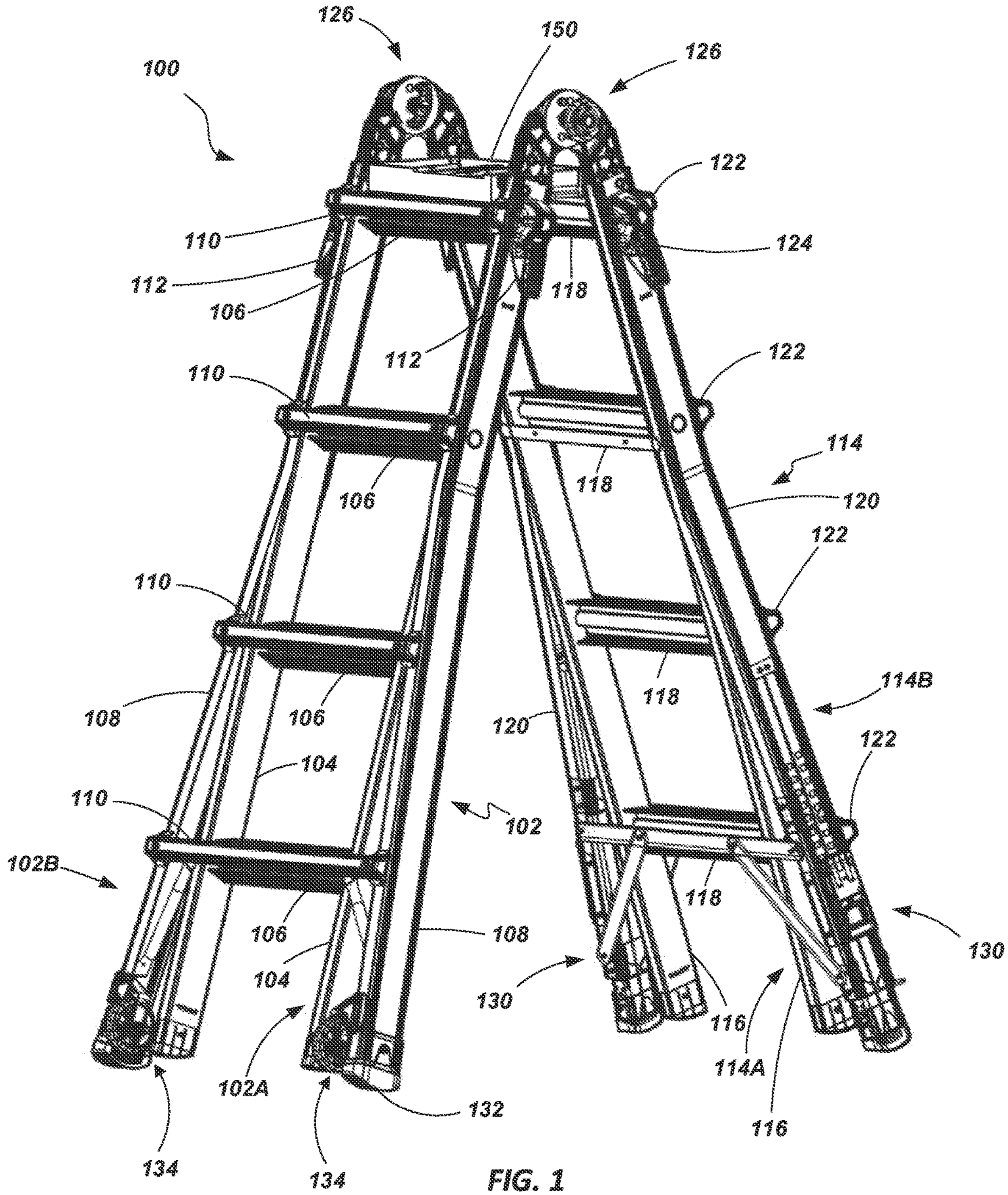
FIG. 1 is a perspective view of a ladder in a step ladder configuration, in accordance with an embodiment with the present invention.
Figure 2:
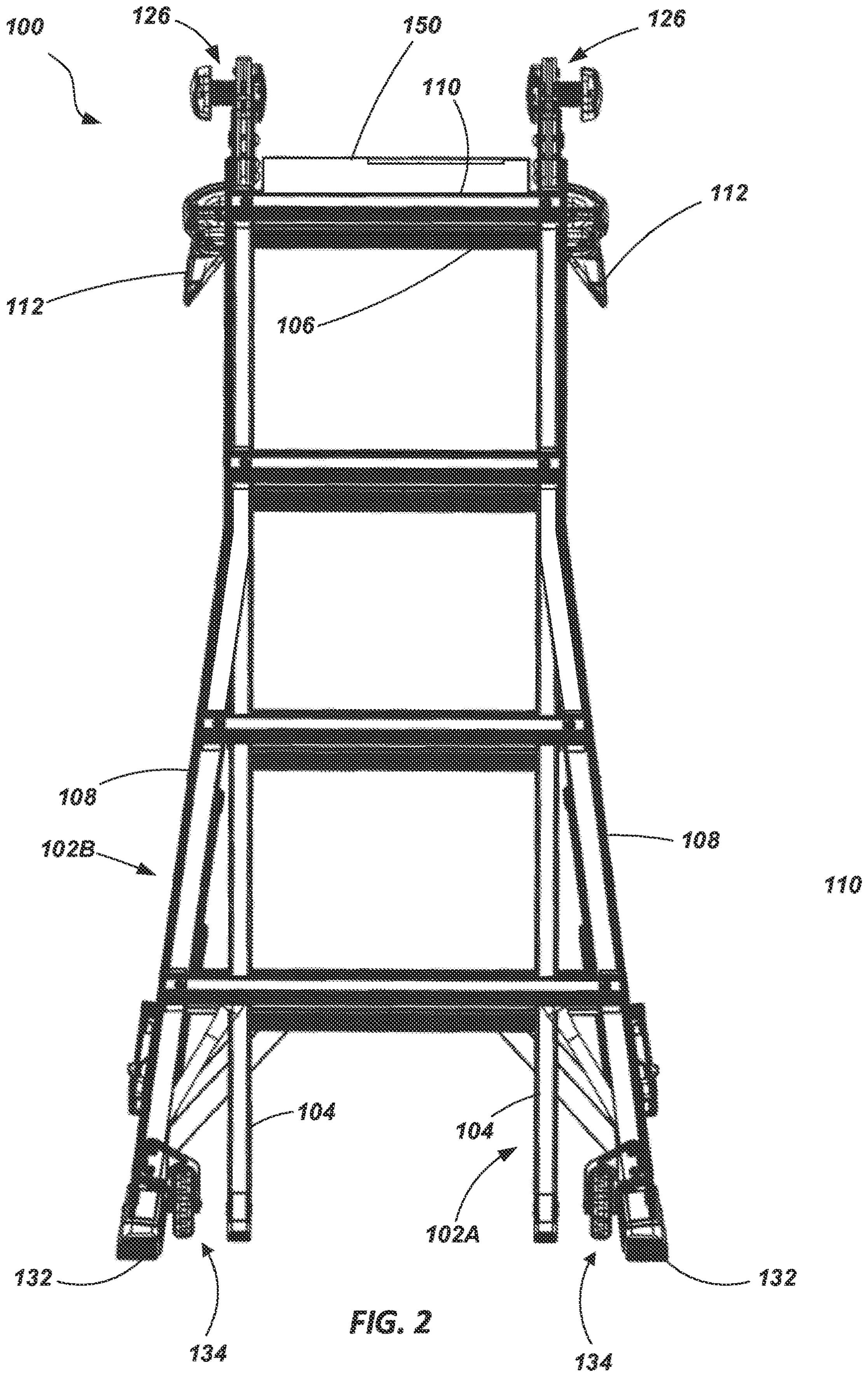
FIG. 2 is a front view of the ladder depicted in FIG. 1.

Referring to FIGS. 1-4, a combination ladder 100 is shown. The combination ladder 100 includes a first rail assembly 102 including an inner assembly 102A slidably coupled with an outer assembly 102B. The inner assembly 102A includes a pair of spaced apart rails 104 coupled with a plurality of rungs 106. Likewise, the outer assembly 102B includes a pair of spaced apart rails 108 coupled to a plurality of rungs 110. The rails 104 of the inner assembly 102A are slidably coupled with the rails 108 of the outer assembly 102B. The inner and outer assemblies 102A and 102B may be selectively locked relative to each other such that one or more of their respective rungs 106 and 110 are aligned with each other. A locking mechanism 112 may be configured to engage a portion of the inner rail assembly 102A and the outer rail assembly 102B so as to selectively lock the two assemblies 102A and 102B relative to each other. While only a single locking mechanism 112 is shown due to the perspective of the ladder represented in FIG. 1, a second, similar locking mechanism is coupled to the other side of the rail assembly 102.

The combination ladder 100 also includes a second rail assembly 114 that includes an inner assembly 114A slidably coupled with an outer assembly 114B. The inner assembly 114A includes a pair of rails 116 coupled with a plurality of rungs 118 and is configured similar to the inner assembly 102A of the first rail assembly 102A described hereinabove. Likewise, the outer assembly 114B includes a pair of rails 120 coupled with a plurality of rungs 122 and is configured similar to the outer assembly 102B of the first rail assembly 102 described hereinabove. Locking mechanisms 124 may be associated with inner and outer assemblies 114A and 114B to enable selective positioning of the inner assembly 114A relative to the outer assembly 114B with respect to the first rail assembly 102.

One exemplary locking mechanism that may be used with the first and second rail assemblies 102 and 114 is described in U.S. Pat. No. 8,186,481, issued 29 May 2012, the disclosure of which is incorporated by reference herein in its entirety. While the locking mechanism described in U.S. Pat. No. 8,186,481 is generally described in conjunction with an embodiment of an adjustable step ladder, such a locking mechanism may by readily used with an embodiment such as the presently described combination ladder as well. It is additionally noted that, in one embodiment, the rail assemblies 102 and 114 may be configured similar to those which are described in U.S. Pat. No. 4,210,224 to Kummerlin, the disclosure of which is incorporated by reference in its entirety. Of course, other configurations of rail assemblies may be utilized.

The first rail assembly 102 and the second rail assembly 114 are coupled to each other may way of a pair hinge mechanisms 126. Each hinge mechanism 126 may include a first hinge component coupled with a rail of the first rail assembly's inner assembly 102A and a second hinge component coupled with a rail of the second rail assembly's inner assembly 114A. The hinge components of a hinge pair 126 rotate about a pivot member such that the first rail assembly 102 and the second rail assembly 114 may pivot relative to each other. Additionally, the hinge mechanisms 126 may be configured to lock their respective hinge components (and, thus, the associated rails to which they are coupled) at desired angles relative to each other. One example of a suitable hinge mechanism is described in U.S. Pat. No. 4,407,045 to Boothe, issued 4 Oct. 1983, the disclosure of which is incorporated by reference herein in its entirety. Another example of a hinge that may be used is described in U.S. Pat. No. 10,801,261 to Peterson et al., issued on 13 Oct. 2020, the disclosure of which is incorporated by reference herein in its entirety. Of course, other configurations of hinge mechanisms are also contemplated as will be appreciated by those of ordinary skill in the art.

The combination ladder 100 is constructed so as to assume a variety of states or configurations. For example, using the locking mechanisms (112 or 124) to adjust a rail assembly (102 or 114) enables the ladder 100 to adjust in height. More specifically, considering the first rail assembly 102, as the rail assembly 102 is adjusted—with the outer assembly 102B being displaced relative to the inner assembly 102A—the associated locking mechanisms 112 engages the inner and outer assemblies (102A and 102B) when they are at desired relative positions with the rungs (106 and 110) of the inner and outer assemblies (102A and 102B) at a desired vertical spacing relative to each other. At some of the adjustment heights of the rail assembly 102, at least some of their respective rungs (106 and 110) align with each other (such as shown in FIG. 1). The second rail assembly 114 may be adjusted in a similar manner.

Considering the embodiment shown in FIG. 1, adjustment of the rail assemblies 102 and 114 enables the ladder 100 to be configured as a step ladder with, for example, four effective rungs at a desired height (as shown in FIG. 1), or to be configured as a step ladder that is substantially taller having five, six, seven or eight effective rungs, depending on the relative positioning of the inner and outer assemblies. However, it is noted that the inner and outer rail assemblies (e.g., 102A and 102B) may be configured with more or fewer rungs than four. It is also noted that the first rail assembly 102 and the second rail assembly 114 do not have to be adjusted to similar heights (i.e., having the same number of effective rungs). Rather, if the ladder is used on an uneven surface (e.g., on stairs), the first rail assembly 102 may be adjusted to one height while the second rail assembly 114 may be adjusted to a different height in order to compensate for the slope of the supporting surface, for use on a set of stairs, or in a variety of other scenarios where the ground or support surface may exhibit a change in elevation between the first and second rails assemblies 102 and 114.

Additionally, the hinge mechanisms 126 provide for additional adjustability of the ladder 100. For example, the hinge pairs 126 enable the first and second rail assemblies 102 and 114 to be adjusted to a variety of angles relative to each other. As shown in FIG. 1, the first and second rail assemblies 102 and 114 may be configured at an acute angle relative to each other such that the ladder may be used as a self-supporting ladder, similar to a step ladder. Thus, this ladder state is referred to herein as a "step ladder configuration" or a "free standing" configuration wherein the ladder can stably support itself upon a horizontal surface with the rail assemblies non-parallel to each other. However, the first and second rail assemblies 102 and 114 may be rotated or pivoted about the hinge mechanisms 126 so that they extend from one another in substantially the same plane (i.e., exhibiting an angle of substantially 180° with respect to each other—see FIGS. 11-13) with the hinge mechanisms 126 locking them in such an orientation. When configured in this manner, the ladder 100 may be used as an extension ladder. Moreover, each of the first and second assemblies 102 and 114 are still adjustable as to height (i.e., through the relative displacement of their respective inner and outer assemblies). It is additionally noted that the rungs of the various assemblies (i.e., rungs 106, 110, 118 and 122) are configured to have support surfaces on both the tops and the bottoms thereof so as to enable their use in either a step ladder configuration or an extension ladder configuration.

Figure 14:
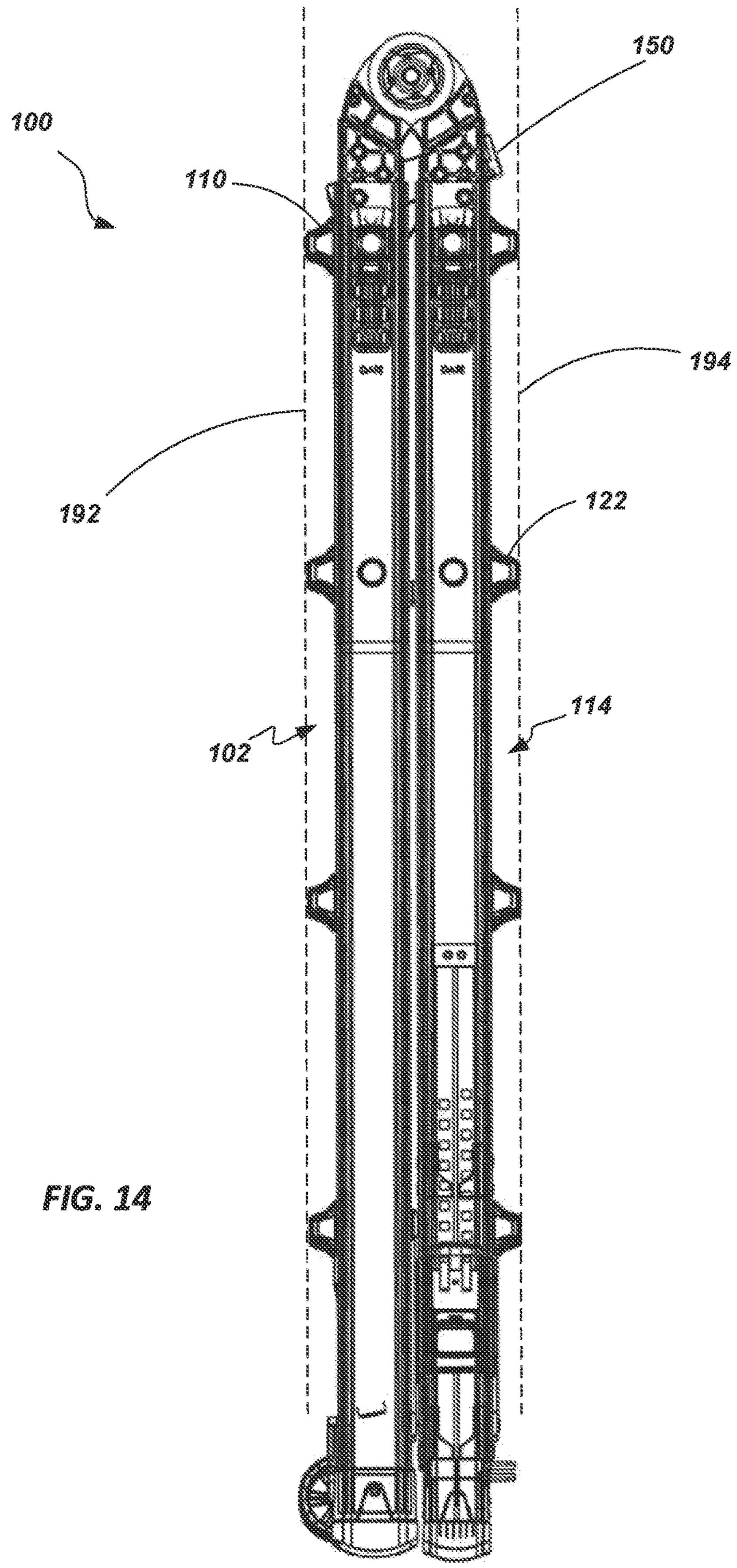
FIG. 14 is a side view of the ladder shown in FIGS. 1 and 11 while in a collapsed or closed state.
Figure 15:
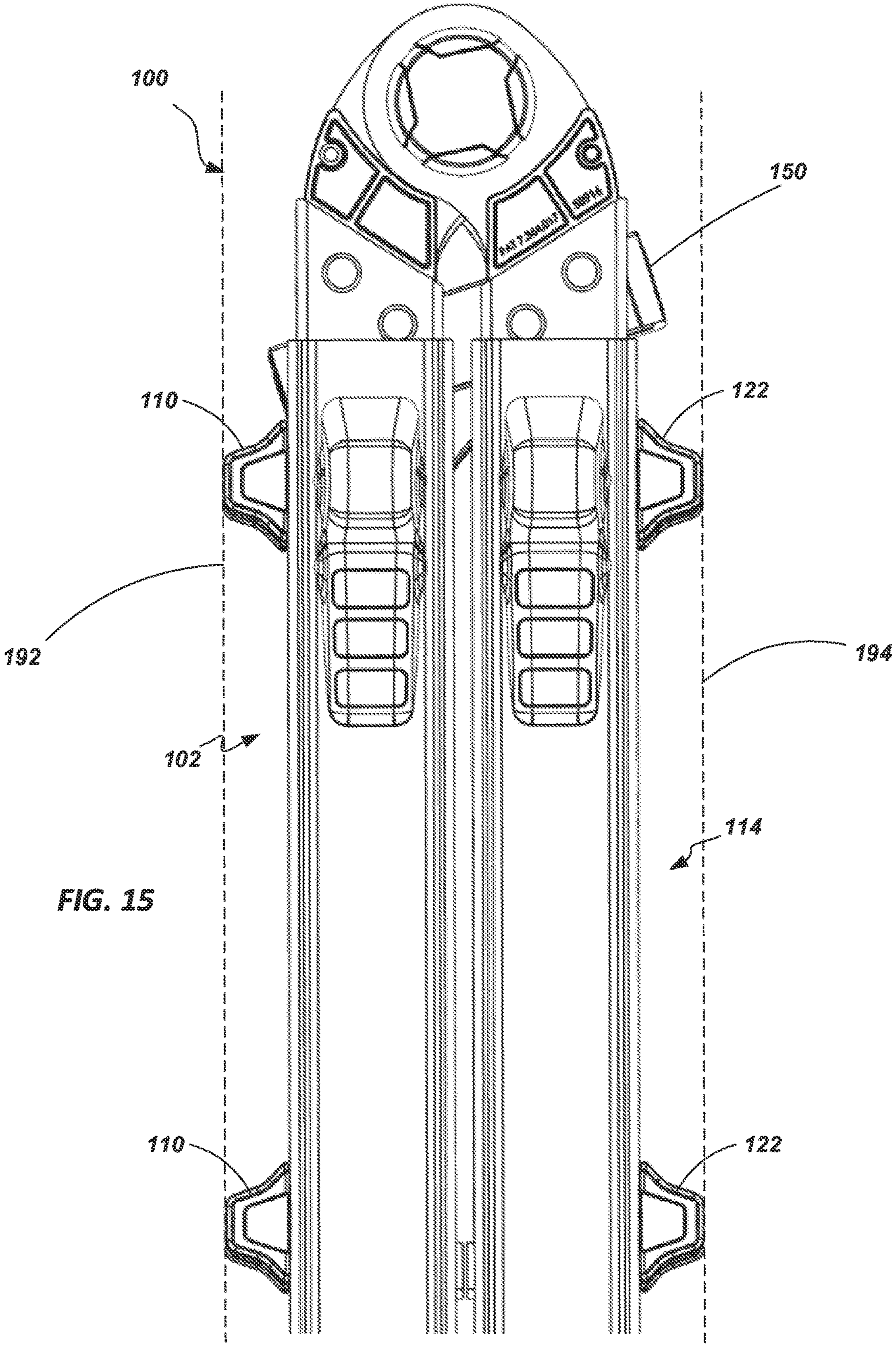
FIG. 15 is an enlarged side view of an upper portion of the ladder shown in FIG. 14.

Additionally, as shown in FIGS. 14-15, the first and second rail assemblies 102 and 114 may be rotated or pivoted about the hinge mechanisms 126 in order to be placed in a collapsed (or closed or "stored") state wherein the first and second rail assemblies 102 and 114 are positioned immediately adjacent one another, with the rails of each assembly 102 and 114 extending substantially parallel to one another (e.g., outer rails 108 adjacent to, and extending substantially parallel to, rails 120). This places the ladder 100 in a convenient configuration for storage and/or transport of the ladder 100.

The second rail assembly 114 may additionally include an integrated leveler mechanism 130 associated with each rail 120 of the outer assembly 114B. The leveler mechanisms 130 may be independently actuated to compensate for an uneven support surface (e.g., sloping ground, a step on one side of the ladder, etc.) upon which the first assembly 102 may be positioned. For example, the leveler mechanisms may be configured such as described in U.S. Pat. No. 9,797,194 to Moss et al., issued 24 Oct. 2017, the disclosure of which is incorporated by reference herein in its entirety.

The ladder 100 may additionally include feet 132 coupled with the ends of the various rails 104, 108, 116 and 120. The feet 132 may include traction features to provide additional stability to the ladder 100 when those feet are positioned against a supporting surface (e.g., on a floor, on a ground, or against a wall). Additionally, the feet may be formed of a non-marking material so as to not leave marks or otherwise mar a supporting surface. As shown in FIG. 1, the first assembly 102 may include a pair of wheels 134 associated with a pair of rails (e.g., coupled with the outer rails 108). The wheels 134 may be configured such that when the ladder 100 is in the step ladder configuration (e.g., FIG. 1) and when properly oriented and supported for use, the wheels do not contact the floor or ground. Additionally, when the ladder 100 is in the extended position, the wheels are positioned such that they are at an upper end of the ladder and do not contact a wall or other elevated supporting surface. A non-limiting example of feet and wheels associated with a ladder is described in U.S. Pat. No. 10,501,990 to Moss et al., issued 10 Dec. 2019, the disclosure of which is incorporated by reference herein in its entirety.

The ladder 100 additionally includes a top cap 150 coupled with an inner rung 106 of the first assembly 102. The top cap 150 can be referred to as a top cap due to being a "cap" which covers a top rung 106 and forms a platform or tray at the top end of the ladder 100 when the ladder 100 is in a stepladder/free-standing configuration. The top cap 150 can also be referred to as a ladder accessory, a tray attachment, or similar device because it can form a tray area for the ladder 100, can be selectively attachable and removable from the ladder 100, and can be an "accessory" added to existing ladders. With reference to FIGS. 1-6, the top cap 150 extends in a cantilevered manner from the uppermost inner rung 106 of the first rail assembly 102 (i.e., the inner rung closest to the hinges 126) independently and without being supported by any other nearby rungs or rails. The top cap 150 may include a variety of features such as compartments, openings (e.g., through-holes) or other structures for holding supplies (e.g., screws, nails, other fasteners, etc.), hand tools (e.g., putty knives, screw drivers, wrenches, hammers, etc.), power tools (e.g., drills, saws, etc.), and containers. In one example, features 155 may be configured for holding different sizes of paint canisters. Examples of features such as these are described in U.S. patent application Ser. No. 17/495,374 entitled, "TOP CAP AND ACCESSORY TRAY FOR LADDERS AND LADDERS INCORPORATING SAME," filed 6 Oct. 2021, the disclosure of which is incorporated by reference herein in its entirety.

Figure 3:
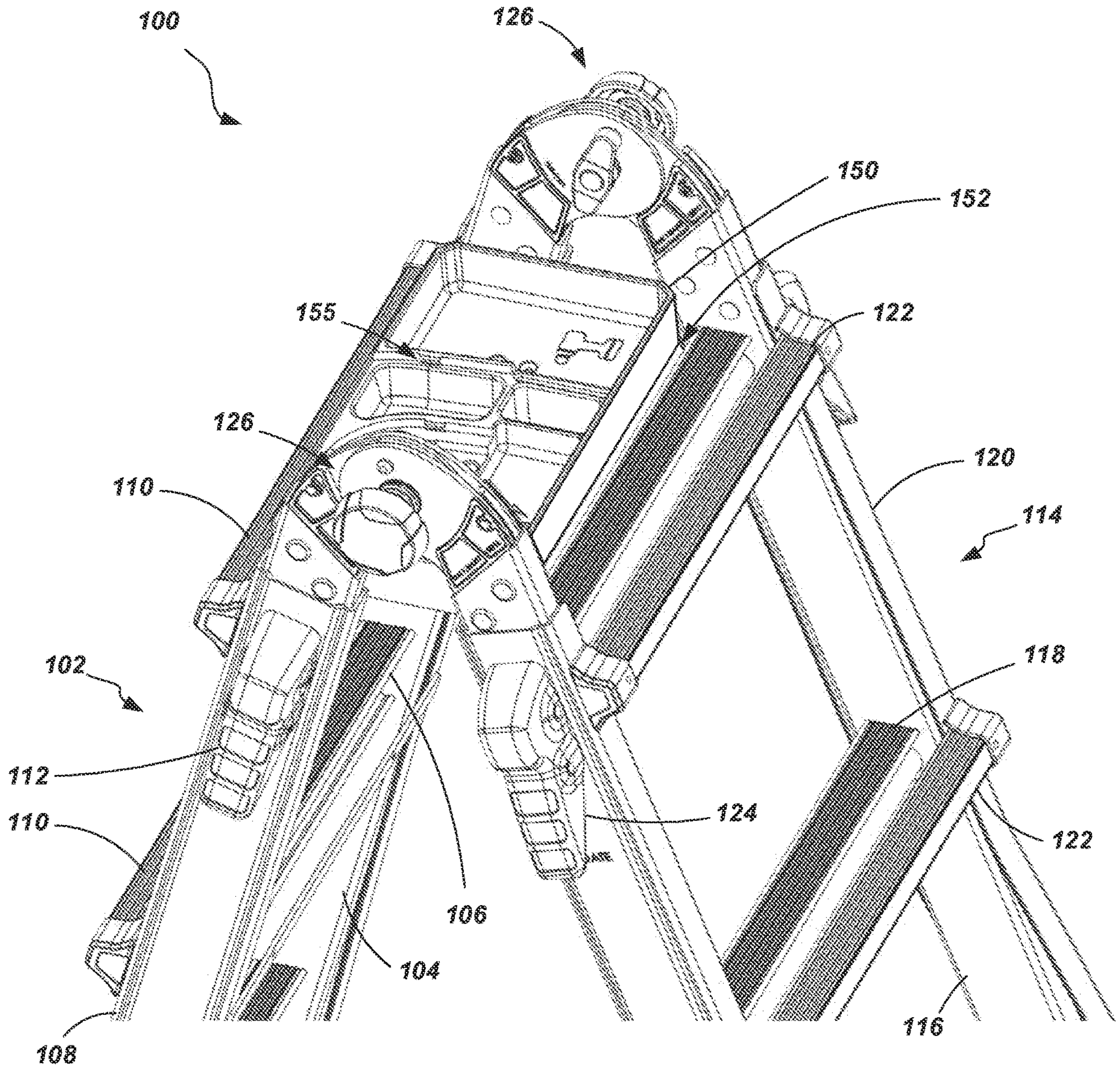
FIG. 3 is a perspective view of an upper portion of the ladder shown in FIG. 1.
Figure 4:
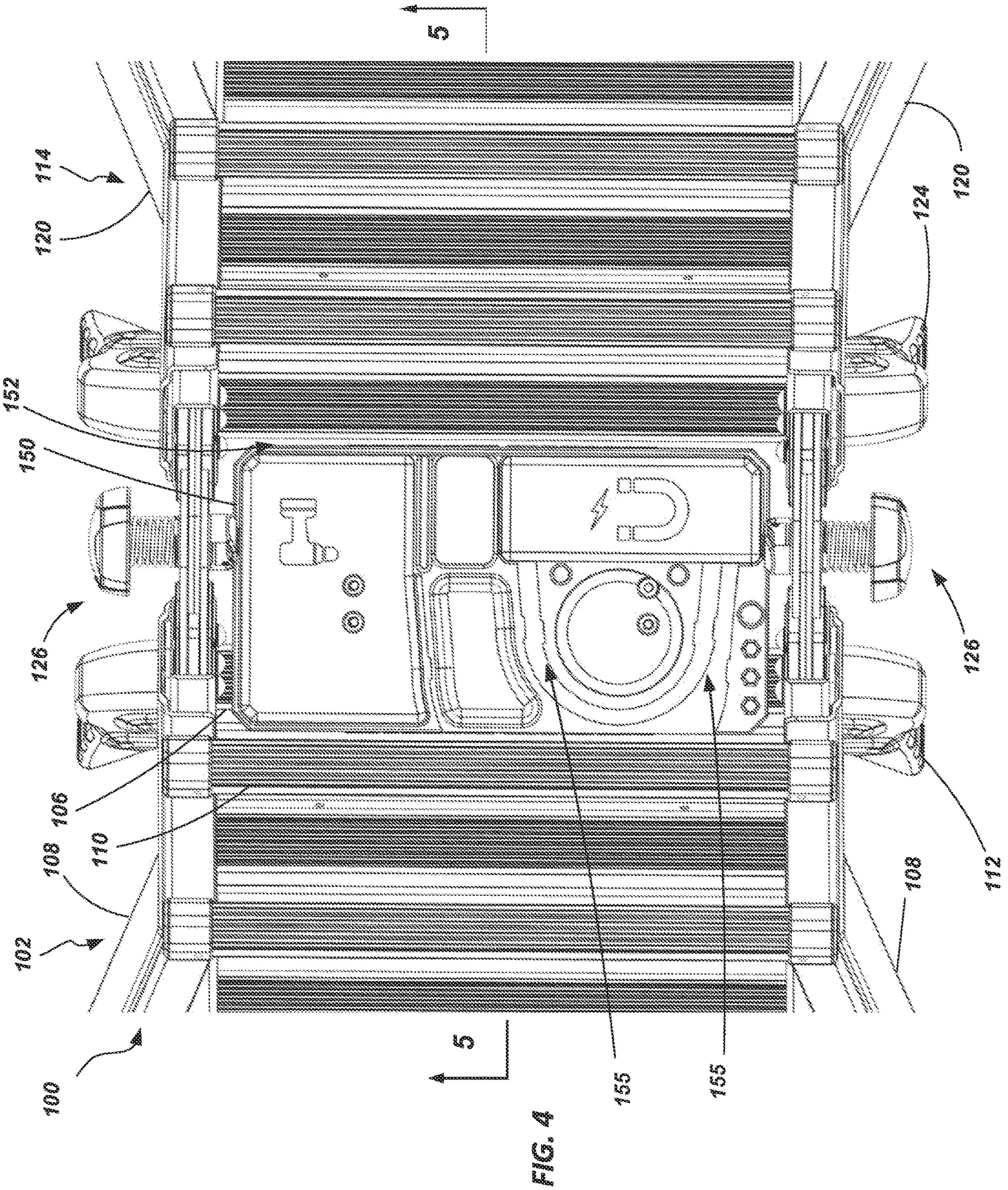
FIG. 4 is a top view of an upper portion of the ladder shown in FIG. 1.
Figure 5:
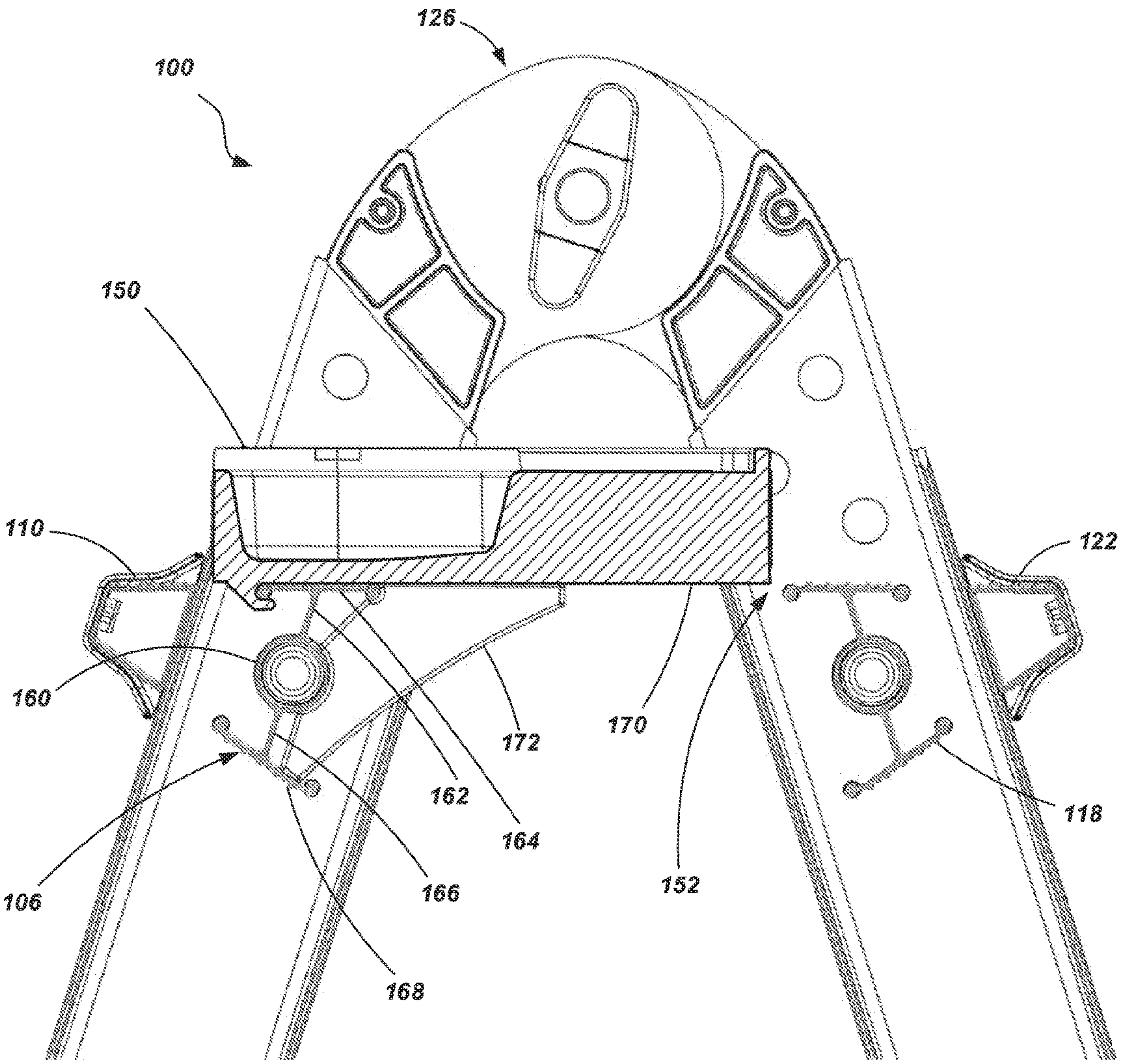
FIG. 5 is a cross-sectional view of the ladder shown in FIG. 1, as indicated by section lines 5-5 in FIG. 4.

Being cantilevered from the inner rung 106 (e.g., see FIGS. 5 and 6), the top cap 150 extends toward the uppermost inner rung 118 of the second assembly 114 (while the ladder is in a step ladder configuration as shown in FIGS. 1-4) without contacting the inner rung 118 of the second assembly 114. As best seen in FIGS. 3-5, the cantilevered nature of the top cap 150 results in a gap 152 being formed between the cantilevered edge of the top cap 150 (i.e., the edge at the end of the lower surface 176 nearest to inner rung 118 and which is not supported underneath) and the uppermost inner rung 118 of the second assembly 114 when the ladder 100 is in the step ladder configuration. In one embodiment, the gap 152 may be, for example, approximately 1/16 of an inch or greater. In another embodiment, the gap 152 may be approximately 1/8 of an inch or greater. In another embodiment, the gap 152 may be between approximately 1/8 of an inch and approximately 1 inch. A lower surface 176 (see FIG. 6) of the top cap 150 can extend from and parallel to a top surface of a tread portion of an inner rung 106 of the first assembly. Thus, the top cap 150 can have a bottom (i.e., downward-facing) surface that is coplanar with a plane defined by the tread or upward-facing surfaces of two inner rungs 106, 118 of the pair of assemblies 102, 114 when the assemblies 102, 114 are in a free standing configuration (e.g., as shown in FIGS. 1-5, where four feet or rails of the ladder 100 support the ladder 100 on a horizontal support surface rather than the ladder 100 leaning against a support surface (e.g., as would generally be done with the straight configuration of FIGS. 11-13 or the collapsed/storage configuration of FIGS. 14-15).

Figure 6:
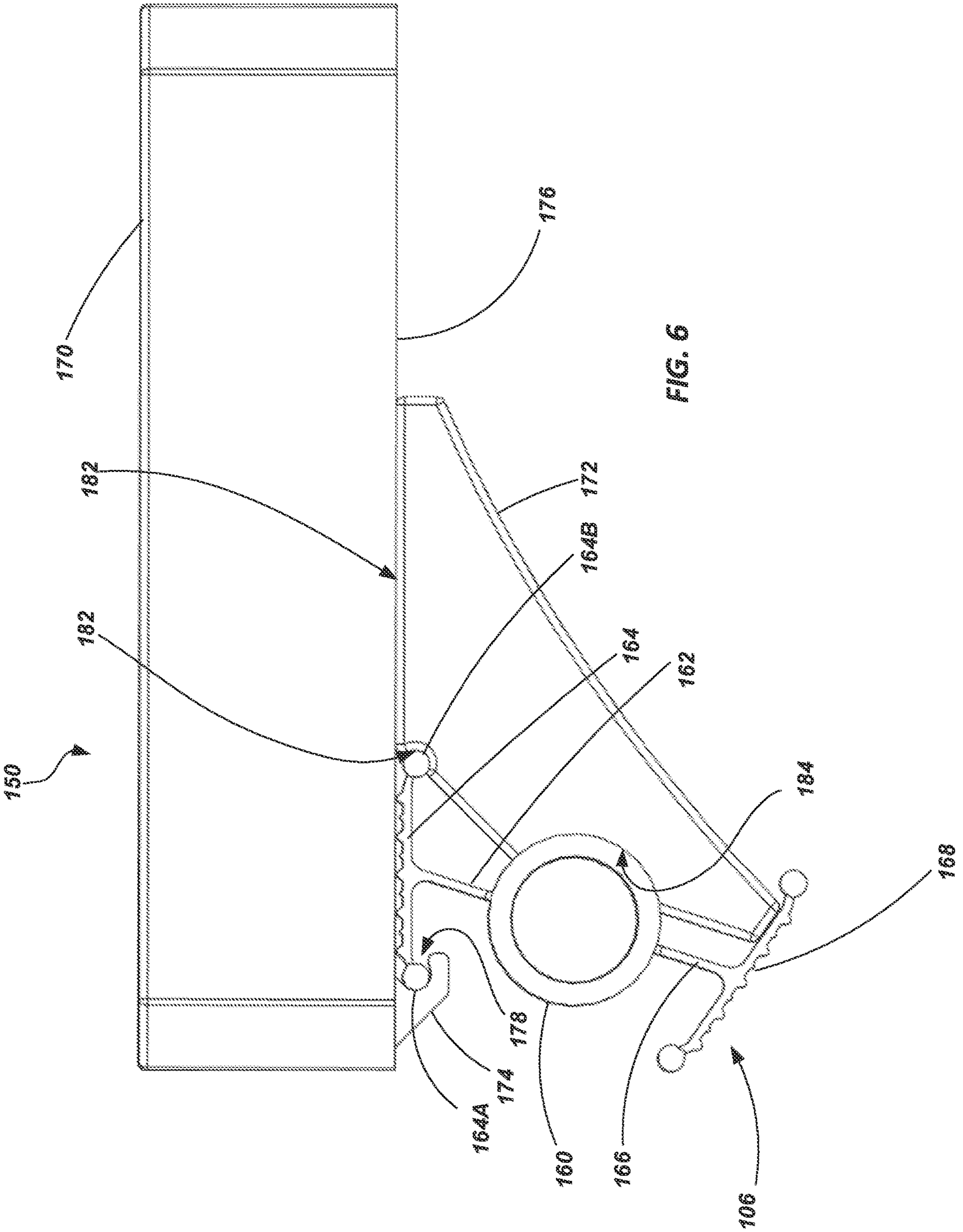
FIG. 6 is a side view of a top cap attached to a rung of a ladder as illustrated in FIGS. 1-5.

Referring briefly to FIGS. 5 and 6, the inner rung 106 is configured to include a central body portion 160 (which may be substantially cylindrical), a first web portion 162 connected between the central body portion 160 and a first tread portion 164, and a second web portion 166 connected between the central body portion and a second tread portion 168. In one embodiment, the inner rung may be formed as a monolithic member (e.g., formed in part by extrusion or molding). In another embodiment, the inner rung 106 may be formed of multiple components joined together by appropriate joining techniques (e.g., the first tread portion 164 may be welded to the first web portion 162, which may be welded to the central body portion 160, etc.). It is also noted that while cross-sectional and profile views are shown in FIGS. 5 and 6, respectively, that these components (i.e., the central body portion 160, the web portions 162 and 166, and the tread portions 164 and 168) may each extend between adjacent rails of an associated assembly (e.g., between inner rails 104 of the first assembly 102).

Figure 20:
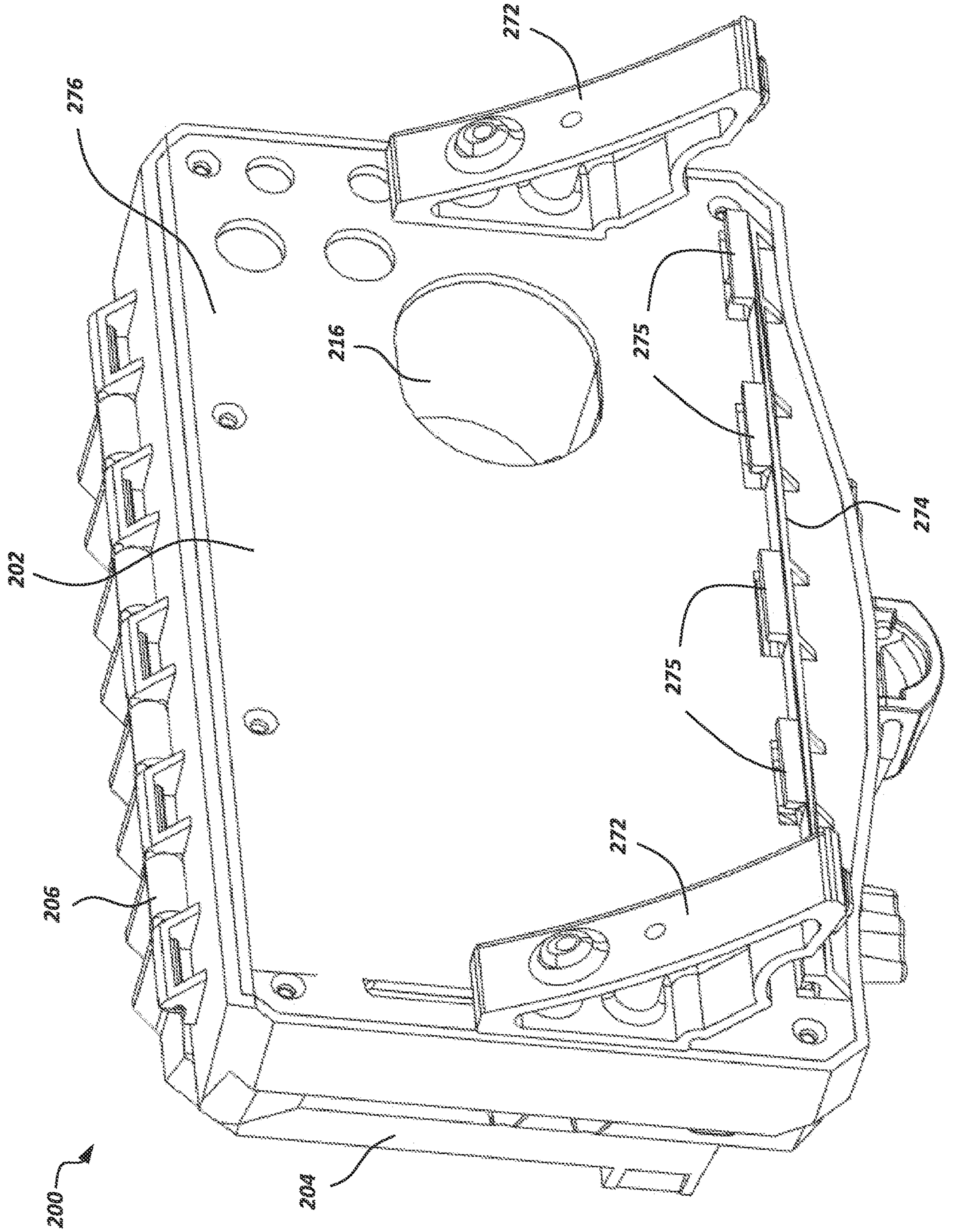
FIG. 20 is a bottom perspective view of the top cap of FIG. 16.

As seen in FIGS. 5-10, the top cap 150 includes a main body 170 (which may also be referred to as a tray) and one or more bracket members 172. The main body 170 may include a protrusion 174 formed along a lower surface 176 of the main body 170, the protrusion 174 having a channel or groove 178 defined therein. In one embodiment, the protrusion 174 and associated groove 178 may be elongated across a substantial portion of the width of the main body 170 (see e.g., FIG. 8). In other embodiments, multiple protrusions and associated grooves may be formed (e.g., at spaced apart widths along the lower surface 176 of the main body 170). For example, a protrusion 274 is shown in FIG. 20 which includes a plurality of spaced-apart tabs 275 that are each configured to engage the rung 106 with space between each tab 275. Including gaps between the tabs 275 can ease manufacturing and can ease insertion and removal of the rung 106 from the protrusion 274. The groove 178 is sized and configured to receive an edge portion (e.g., a front edge 164A or lip of the first tread portion 164) of the inner rung 106.

Figure 7:
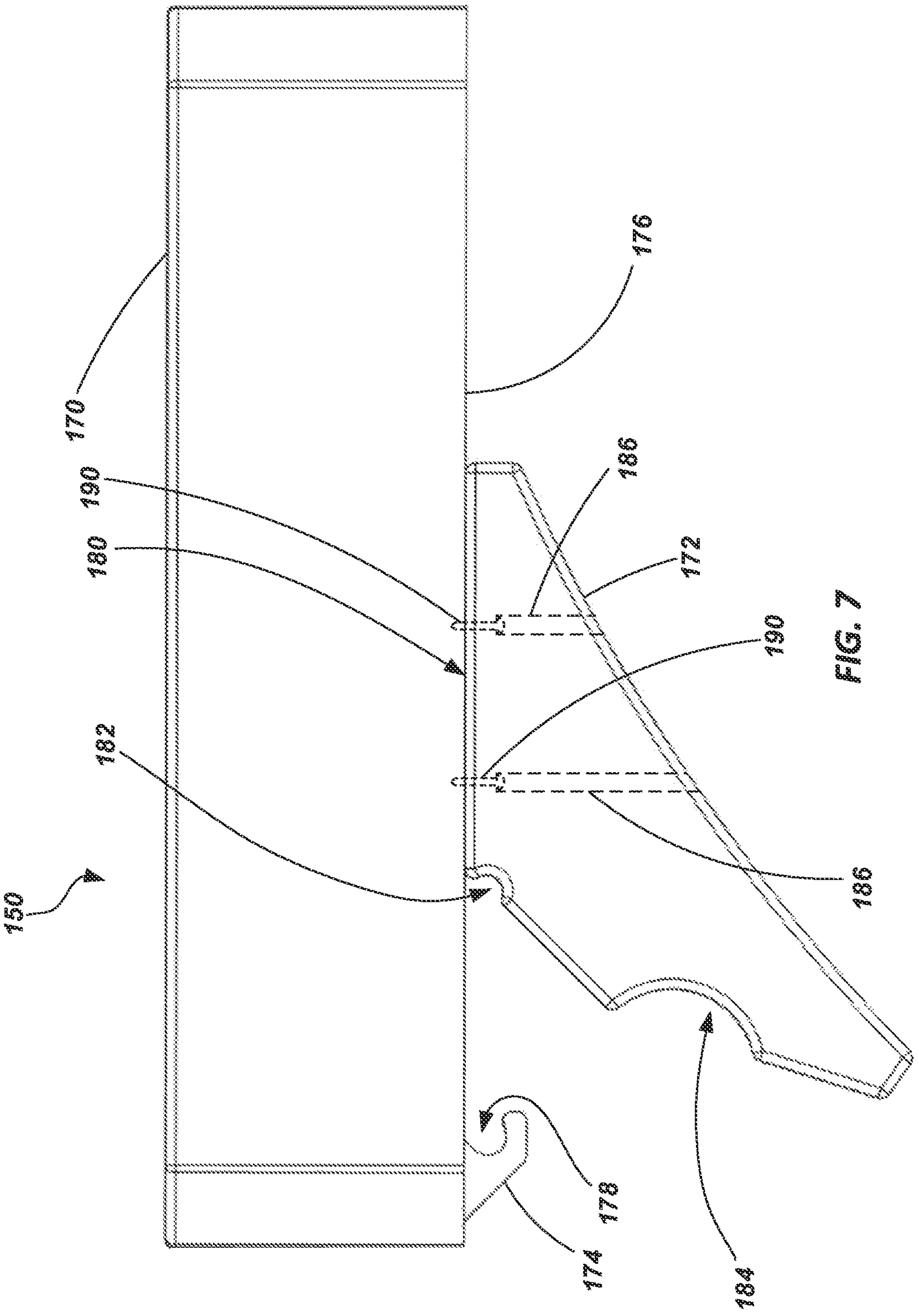
FIG. 7 is a side view of the top cap and associated brackets shown in FIG. 6.
Figure 8:
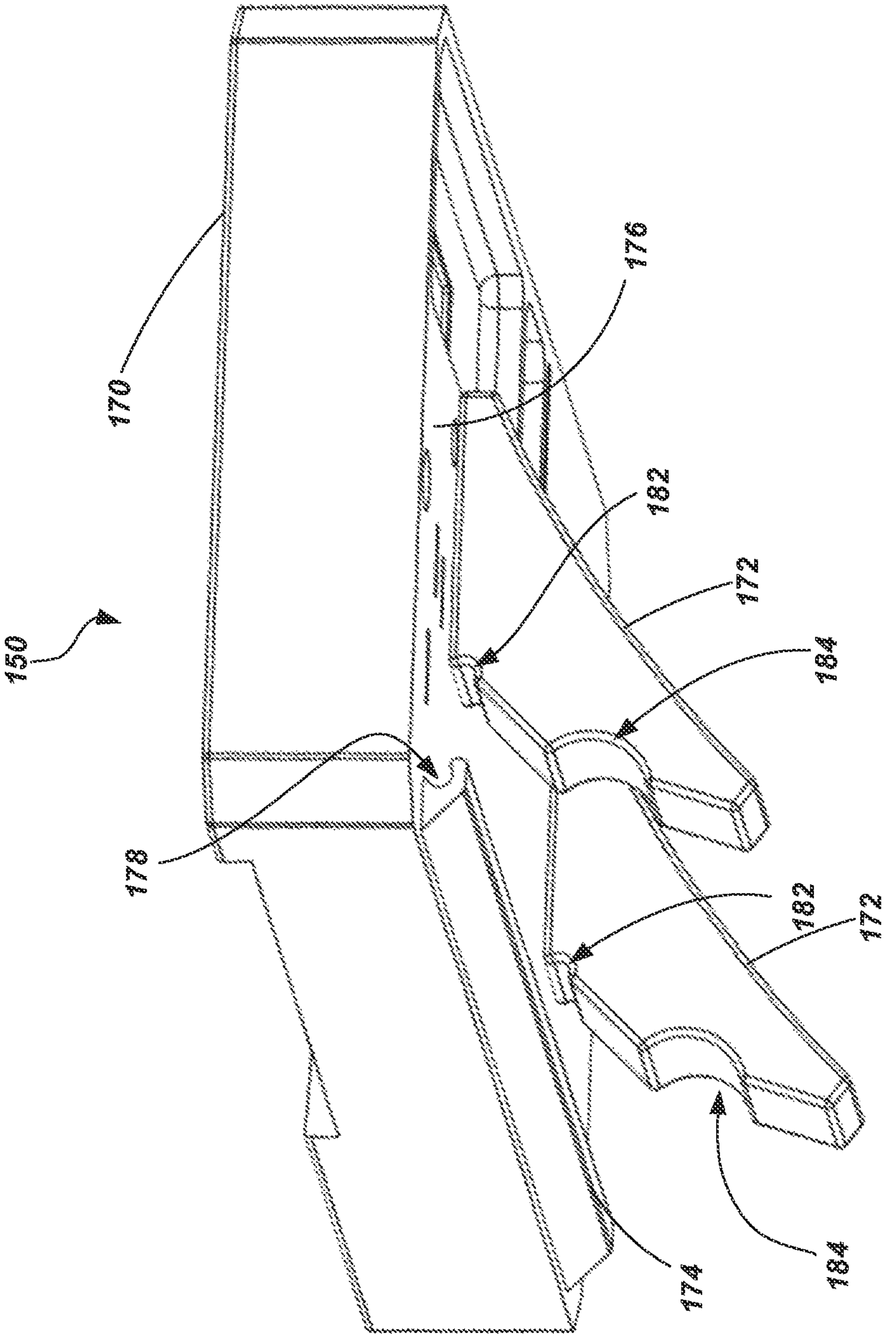
FIG. 8 is a lower perspective view of the top cap and brackets shown in FIG. 6.
Figure 9:
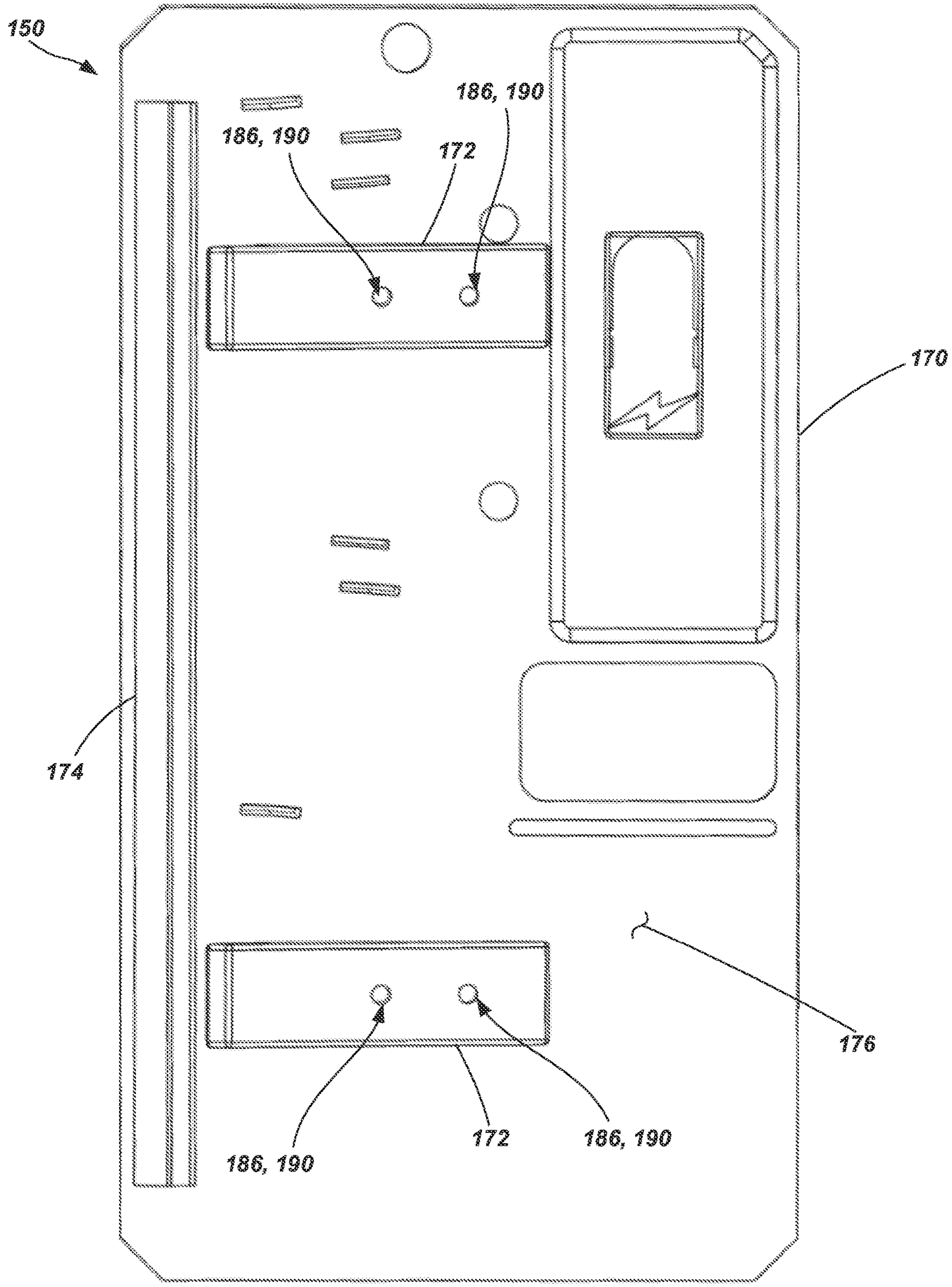
FIG. 9 is a bottom view of the top cap and brackets shown in FIG. 6.
Figure 10:
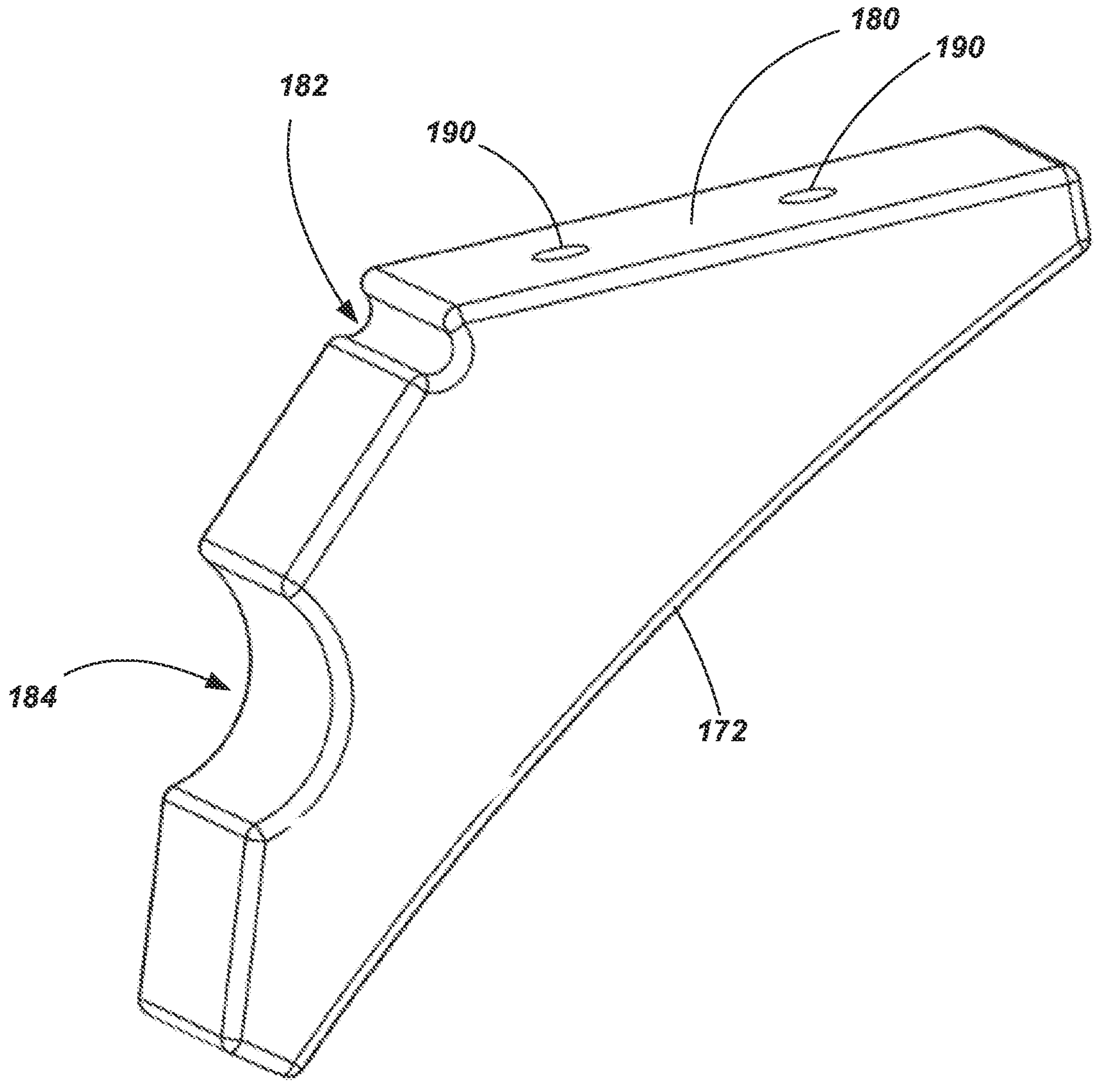
FIG. 10 is perspective view of a bracket shown in FIGS. 5-9.

The bracket members 172 may include a first surface 180 configured to abut the lower surface 176 of the main body 170. The bracket members 172 further include a first channel or groove 182 that is sized and configured to receive an edge portion (e.g., a rear edge 164B or lip of the first tread portion 164) of the inner rung 106. Additionally, the bracket members 172 include a second channel or groove 184 that is sized and configured to abut against (e.g., conformally abut) the central body portion 160 of the inner rung 106. One or more holes or passages 186 may be formed within the bracket members 172 for receipt of an associated fastener 190 which may be used to couple the bracket member 172 to the main body 170. For example, as seen in FIG. 7, a pair of screws or other fasteners may be used to couple a bracket member 172 with the main body 170. The passages 186 may be stepped (having a reduction in diameter) to provide and abutment surface for a head of a fastener. Accordingly, the top cap 150 and brackets 172 can be added to an inner rung 106 without modification of the inner rung 106 (e.g., cutting, drilling, adding adhesives or fasteners, etc.). Additionally, the top cap 150 can be reversibly attached and removed from the rung 106, i.e., it can be attached and removed without damage to or modification of the inner rung 106, such as by removing the fasteners from the passages 186 and thereby loosening or removing the brackets 172 from the main body 170.

In some embodiments, the top cap 150 can be configured with brackets 172 that are repositionable to reversibly release the top cap 150 from the rung 106. As used herein, a top cap or other accessory is "reversibly releasable" from another part when it can be configured attached to the other part and it can be removed from the other part without damage to the other part or to the top cap. For example, a top cap can be reversibly releasable from a rung if the top cap is attached to the rung and then can be removed from the rung and reattached to the same rung in the same state as it started. Thus, permanent adhesives (e.g., glues and epoxies) or modifications to the top cap or rung (e.g., drilling new holes for fasteners) are not needed to reattach the top cap to the rung. Similarly, the brackets 172 can be reversibly releasable from the main body 170, meaning they can be attached to the main body 170 and removed from the main body 170 without damage or structural modification to the main body or bracket. Thus can be achieved using a reversibly releasable fastener (e.g., 190) that can join or attach the bracket 172 to the main body 170 and can also be repeatedly removed or replaced without damage to either the bracket 172 or the main body 170.

In some embodiments, the top cap 150 can be released from the ladder without tools or without removing fasteners. For example, brackets 172 can be configured to slide or rotate out of the clamping position shown in FIG. 5 to release their hold on the surfaces of the rung 106. In some embodiments, the brackets 172 can comprise a flexible material configured to elastically deflect away from the rung 106 to permit withdrawal of the rung 106 from the bracket 172 and protrusion 174. In some embodiments, the brackets 172 can be biased using biasing members (e.g., horizontally oriented springs) to permit biased snap-fitting of the top cap 150 to the rungs 106. In this manner, the top cap 150 can be quickly removed and repositioned on the ladder 100 (or from a first ladder to a second ladder) without tools and without damaging or permanently modifying the rung 106 or top cap 150.

When assembled, the top cap 150 clamps on to the inner rung 106 (e.g., with the upper tread portion 164 being received within the grooves 178 and 182) and the bracket members 172 provide additional support for the cantilevered arrangement by abutting the central body portion 160 of the inner rung 106. As used herein, the top cap 150 is "clamped" to the rung 106 by one side surface of the top cap 150 (on protrusion 174) engaging one side of the rung 106 and a second side surface of the top cap 150 (on bracket 172) engaging an opposite side of the rung 106 and then tightened into place (e.g., by fasteners in grooves 182). Thus, two opposite sides of the rung 106 are placed in engagement with the top cap 150 and are held against the top cap 150 so that the top cap 150 will not disengage from the ladder 100 under normal usage conditions.

The grooves 178, 182 can be referred to as being parts of recess openings formed in the top cap 150. Thus, groove 178 and lower surface 176 can collectively form a recess opening in the top cap 150 that opens toward the rear side of the top cap 150 (i.e., toward bracket member 172). In other words, the recess opening has a front surface and bottom surface defined by the protrusion 174 and a top surface defined by the lower surface 176, and that opening faces rearward on the top cap 150 and parallel to the lower surface 176 so that the tread portion front edge 164A is insertable from the rear side of the protrusion 174 (i.e., the protrusion 174 is moved inward and toward the rear ladder assembly to receive the rung 106). Groove 182 and lower surface 176 can collectively form a second recess opening in the top cap 150 that opens in the opposite direction, thereby facing forward and parallel to the lower surface 176, with a top surface defined by the lower surface 176 and rear and bottom surfaces defined by the bracket member 172. With the rung 106 having tread portion front edge 164A in the first recess opening of protrusion 174, the bracket 172 can be attached to the main body 170 to secure the other side of the tread portion rear edge 164B by sliding the bracket member 172 forward (along the lower surface 176 toward the rung 106) until the tread portion rear edge 164B is within groove 182, at which point the bracket member 172 can be attached to (e.g., fastened to) the main body 170 and thereby immobilized while the rung 106 is clamped between the protrusion 174 and bracket member 172. The bottom walls of the recess openings then physically limit the movement of the tread portion 164 from moving away from the lower surface 176.

The top cap 150 is positioned at a vertical level entirely below both of the hinges 126 when the ladder 100 is in the free standing configuration, as shown in FIGS. 3 and 5. Thus, the space between the hinges 126 is open and capable of receiving tools, paint cups, or other accessories. The tops of the bent hinges 126 can also be used for arm support or as hand grips while the user is climbing or working on the ladder. Also, the inner sides of the hinges 126 remain clear and accessible to assist in adjustment or maintenance of the hinges 126. FIGS. 3 and 5 also show how the top cap 150 is positioned partway along the elongated length dimension of the inner rails 104. In other words, there is a length portion of each of the rails 104 that extends upward between the top cap 150 and the hinges 126, and there is a length portion of each of the rails 104 that extends downward between the top cap 150 and the base of the ladder 100 (i.e., toward feet 132).

Figure 11:
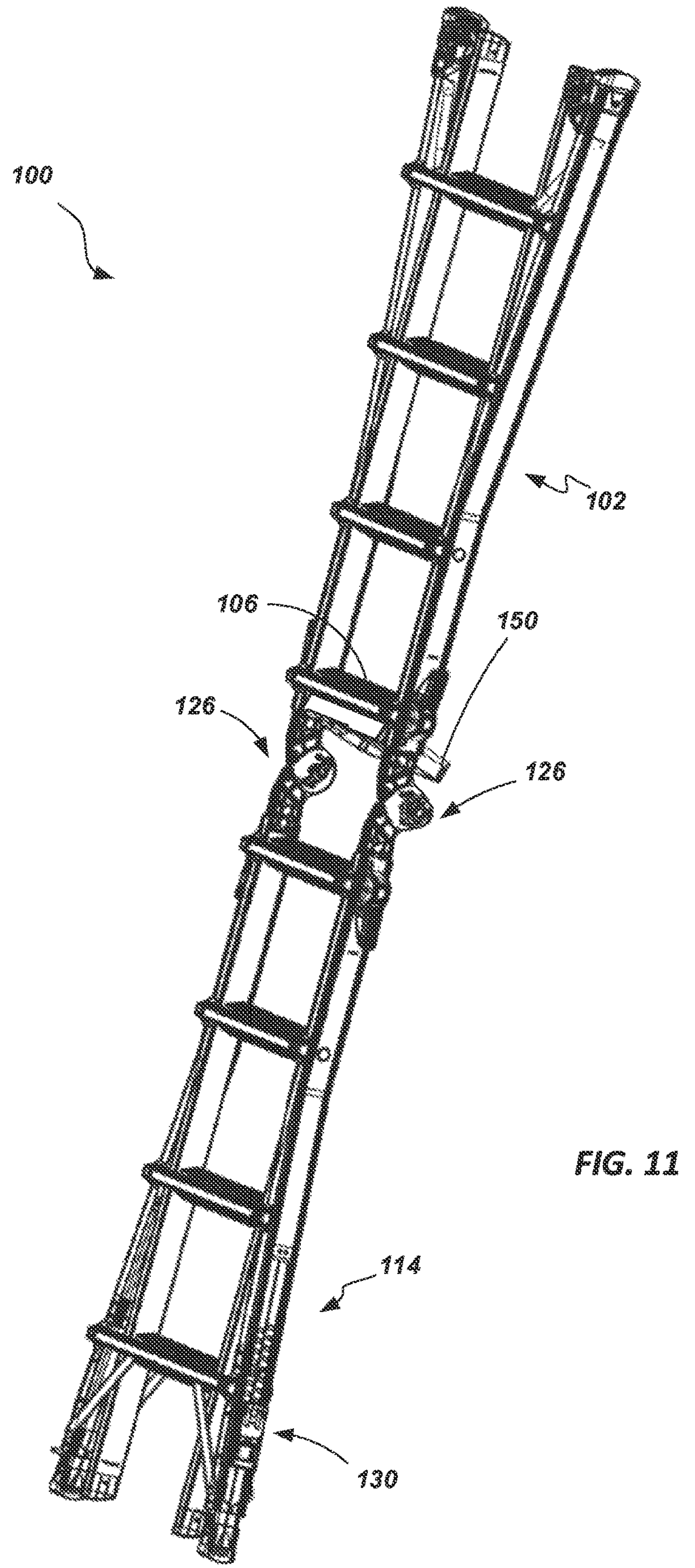
FIG. 11 is a perspective view of the ladder shown in FIG. 1 while the ladder is in an extended state.
Figure 12:
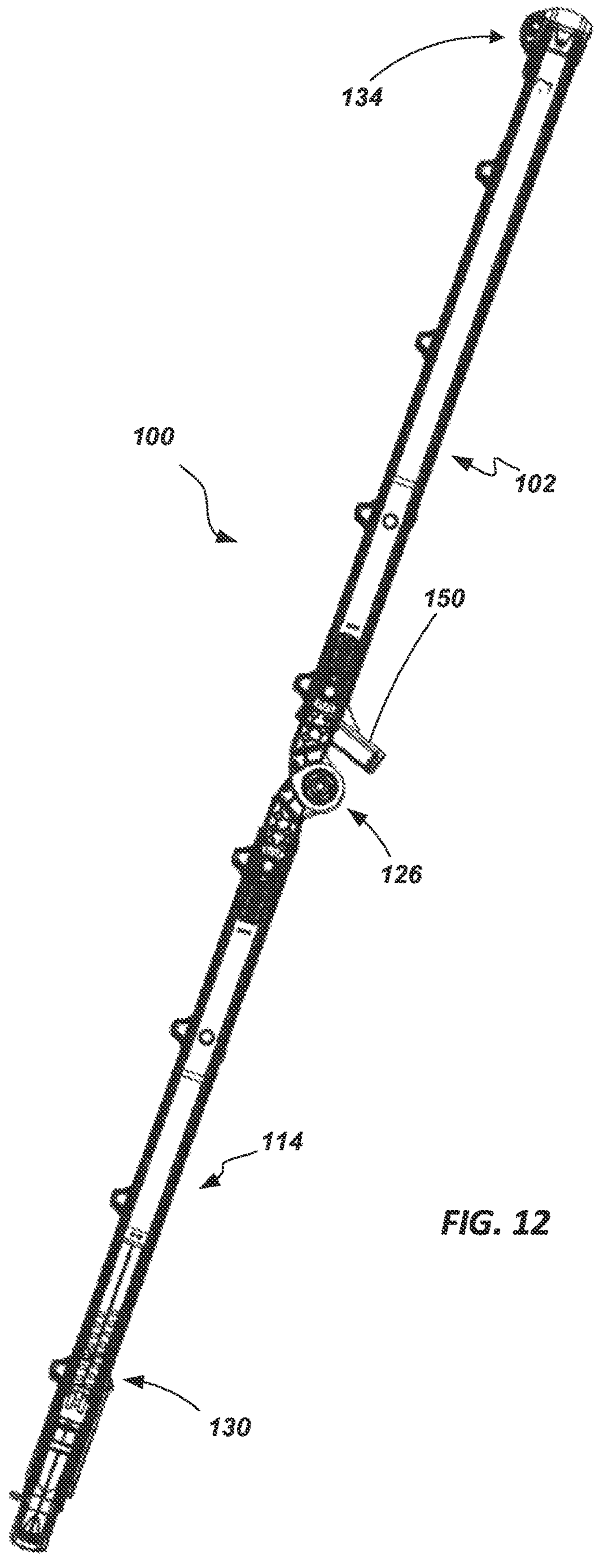
FIG. 12 is a side view of the ladder shown in FIG. 11.
Figure 13:
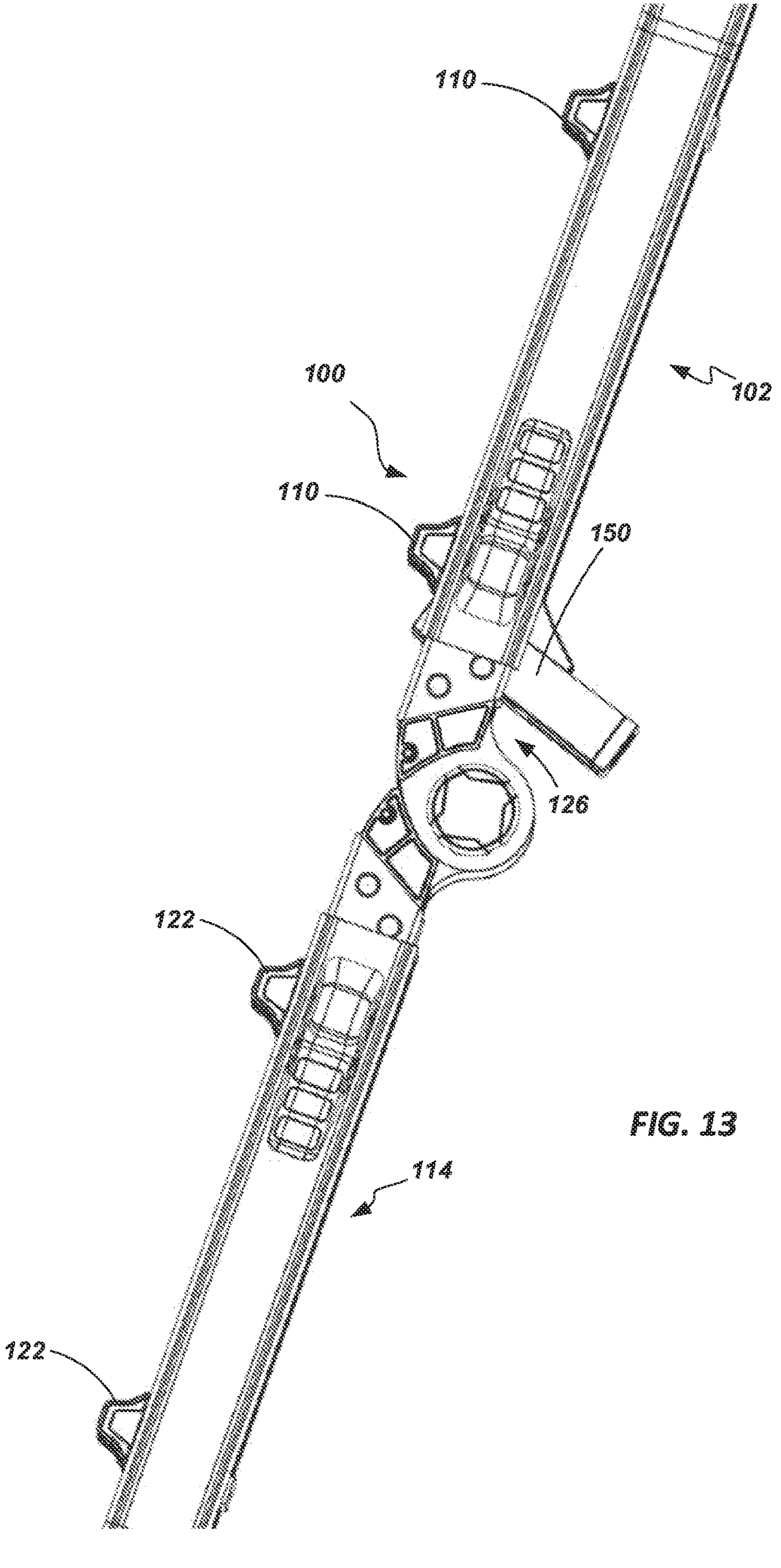
FIG. 13 is an enlarged side view of a portion of the ladder shown in FIG. 11.

As seen in FIGS. 11-13, when the first assembly 102 is pivoted relative to the second assembly 114 to place the ladder 100 in an extended state or "straight" configuration, the top cap 150 rotates with the first assembly 102 and becomes positioned beneath the inner rung 106 to which it is attached. Being positioned beneath the inner rung 106, and extending toward the "rear" of the ladder (when in the position and orientation shown in FIGS. 11-13) the top cap 150 remains out of the away and does not interfere with a user ascending to descending the ladder. It is noted that the top cap 150 is not intended to be stepped on by a user during use of the ladder 100, regardless of the state of configuration of the ladder (e.g., step ladder vs. extended ladder). It is again noted that, when in the extended state, the levelers 130, being associated with the second assembly 114, are positioned on a supporting surface (e.g., on the ground) while the top cap 150 and the wheels 134 are on the rail first assembly 102 and positioned above the hinges 126.

Referring to FIGS. 14 and 15, when the first assembly 102 is pivoted relative to the second assembly 114 to place the ladder 100 in a stored state or collapsed configuration, the top cap 150 rotates with the first assembly 102 relative to the second assembly 114. The top cap 150 may be configured such that when the ladder 100 is in the stored configuration, it is positioned within a volumetric envelope defined by the face surfaces of the outer rungs 110 and 122. In other words, the top cap is positioned between a first plane 192 that extends through the face surfaces of the outer rungs 110 of the first assembly 102 and a second plane 194 that extends through the face surfaces of the outer rungs 122 of the second rail assembly 114. This enables the top cap to be employed (and remain coupled with the ladder) without affecting its volume or size for purposes of storage, transportation or shipping.

It is noted that, while the embodiments shown and described herein include a "top cap" coupled with the uppermost inner rung 106 of the first rail assembly 102, the main body 170 and brackets 172 may be coupled with any other inner rung 106 of the first rail assembly 102 as an accessory tray. Indeed, in some embodiments, each inner rung 106 of the first rail assembly 102 may have an accessory tray coupled thereto which includes a main body and one or more brackets such as described herein. Additionally, the top cap 150 can be attached to the inner rung 106 having its lower surface 176 facing in a substantially opposite direction (as compared to the direction shown in FIG. 6) by being coupled with tread portion 168 and central body portion 160. Thus, the front and rear ends of tread portion 168 can be positioned in the grooves 178, 182, and central body portion 160 can be positioned in groove 184. In this manner, the top cap 150 can be referred to as being in a "straight ladder position" or "inverted rung position," wherein the top cap 150 has its storage compartments opening upward while the top cap 150 is on an inner rung 106 in the top half of the ladder 100 in the state shown in FIGS. 11-13. For example, the top cap 150 can be mounted to the top-most rung of assembly 102 when in the configuration shown in FIG. 11, and the top cap 150 can then serve as a tray or support for the user of the ladder 100 at the top end thereof. Furthermore, the main body 170 and brackets 172 can be coupled with any of the inner rungs 118 of the second rail assembly 114 while engaging either their top tread portions (similar to the configuration shown for top cap 150 with respect to tread portion 164) or while engaging their lower tread portions (similar to the inverted rung position described above). These configurations are made possible in part because the top cap 150 does not extend underneath the bottom tread portion 168 of the inner rung 106, thereby ensuring that the inverted rung 106 can safely act as a foothold for a user of the ladder while the top cap 150 extends from the bottom surface (i.e., tread portion 164) when the rung 106 is in the position shown in FIG. 11. In some embodiments, the top cap 150 can comprise an alternative configuration wherein a portion of the top cap covers the second tread portion 168 in addition to covering the first tread portion 164. See FIGS. 29A-29B and their related descriptions below.

FIGS. 16-27 illustrate a top cap 200 related to the top cap 150. The top cap 200 can have features and structures in common with top cap 150, including bracket members 272 corresponding to brackets 172, a protrusion 274 corresponding to protrusion 174, and a lower surface 276 corresponding to lower surface 176. Thus, all of these features of top cap 200 can function in the manner described in connection with top cap 150. Additionally, the top cap 200 can include two or more body portions 202, 204 configured to articulate and move relative to each other between at least a first configuration and a second configuration, wherein in the first configuration, the body portions 202, 204 are in a closed or vertically stacked configuration, and wherein in the second configuration, the body portions 202, 204 are in an open or horizontally side-by-side configuration. The body portions 202, 204 can be joined by a hinge 206. FIGS. 16-20 show the top cap 200 in the closed configuration, and FIGS. 21-27 show the open configuration.

The brackets 272 and protrusion 274 can be attached to or integrally formed as a part of the first body portion 202. Thus, the top cap 200 can be attached to the ladder (e.g., 100) at an inner rung (e.g., 106), with the inner rung seated between the brackets 272 and protrusion 274, as shown, for example, in broken lines in FIG. 22. When the body portions 202, 204 are in the closed configuration, the second body portion 204 can be retained to the first body portion 202 by the hinge 206 and by a latch 208 that engages a hook or protrusion of the second body portion 204, as shown in FIGS. 16-20. In this configuration, the gap 152 can be present between the rear inner rung 118 on the rear assembly and the first body portion 202. The second body portion 204 can also be out of contact with the rear inner rung 118 since it is stacked upon the first body portion 202.

Figure 18:
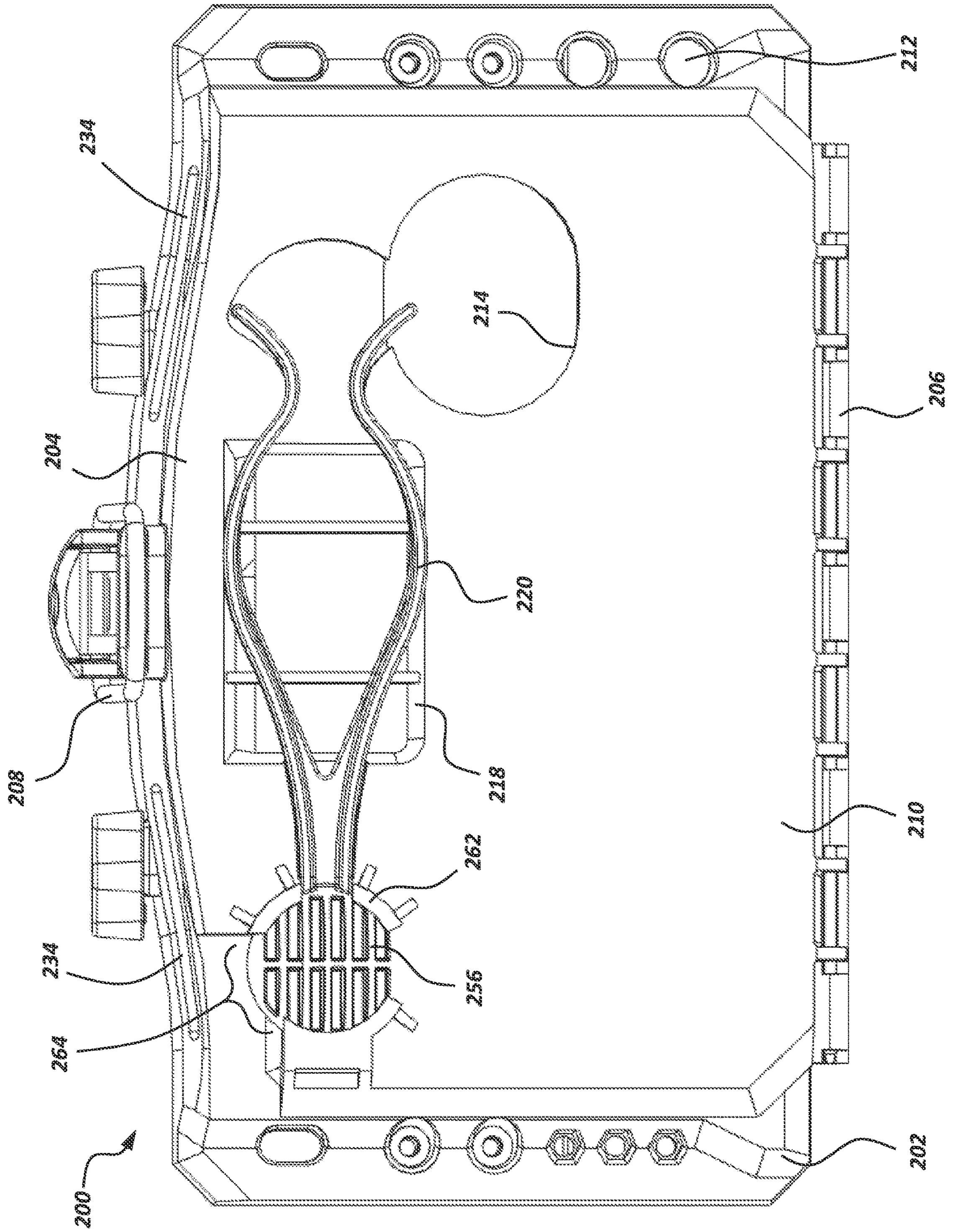
FIG. 18 is a top view of the top cap of FIG. 16.
Figure 19:
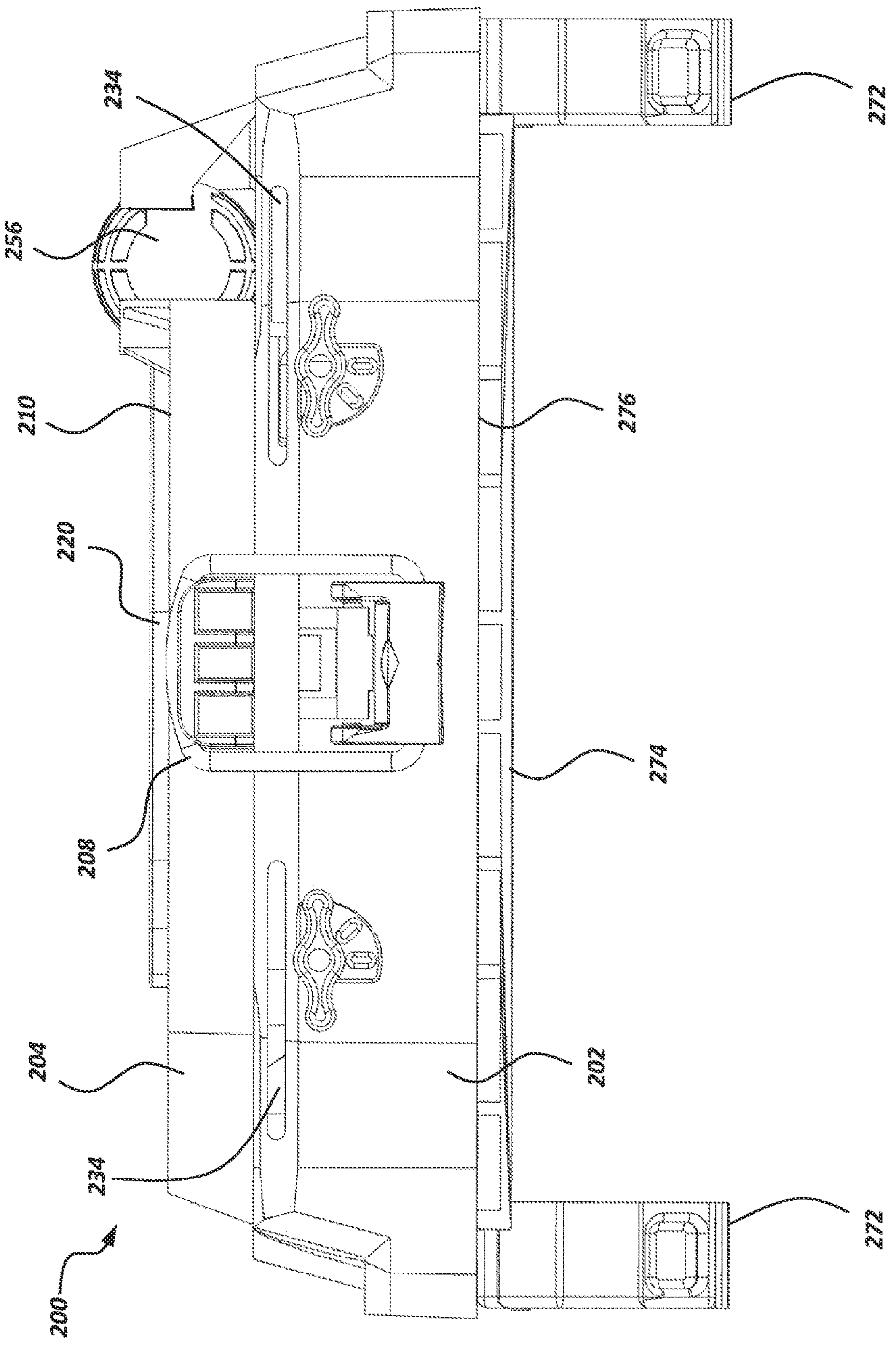
FIG. 19 is a front view of the top cap of FIG. 16.
Figure 23:
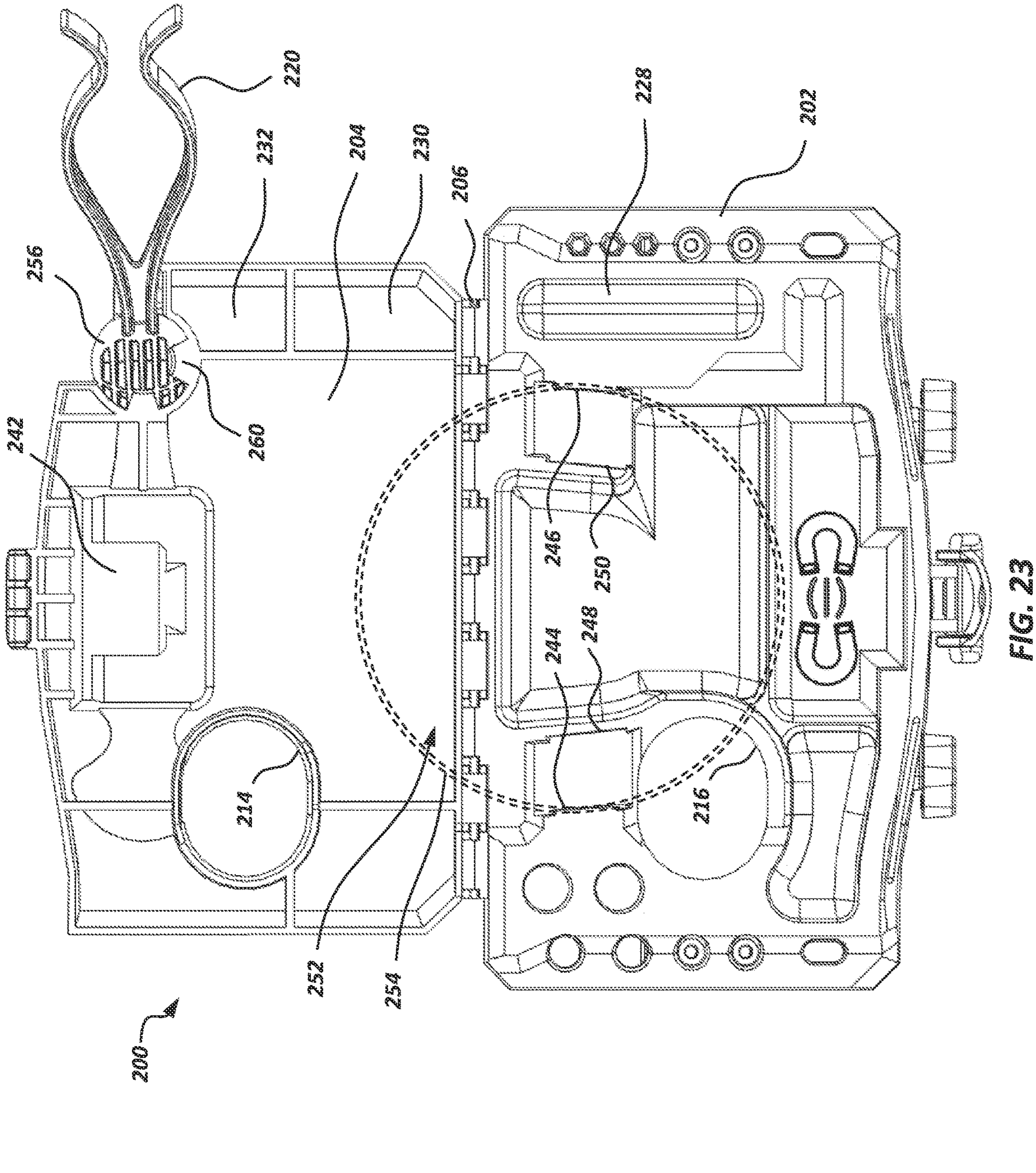
FIG. 23 is a top view of the top cap of FIG. 16 in an opened configuration with a bottom-lipped receptacle shown in broken lines.
Figure 24:
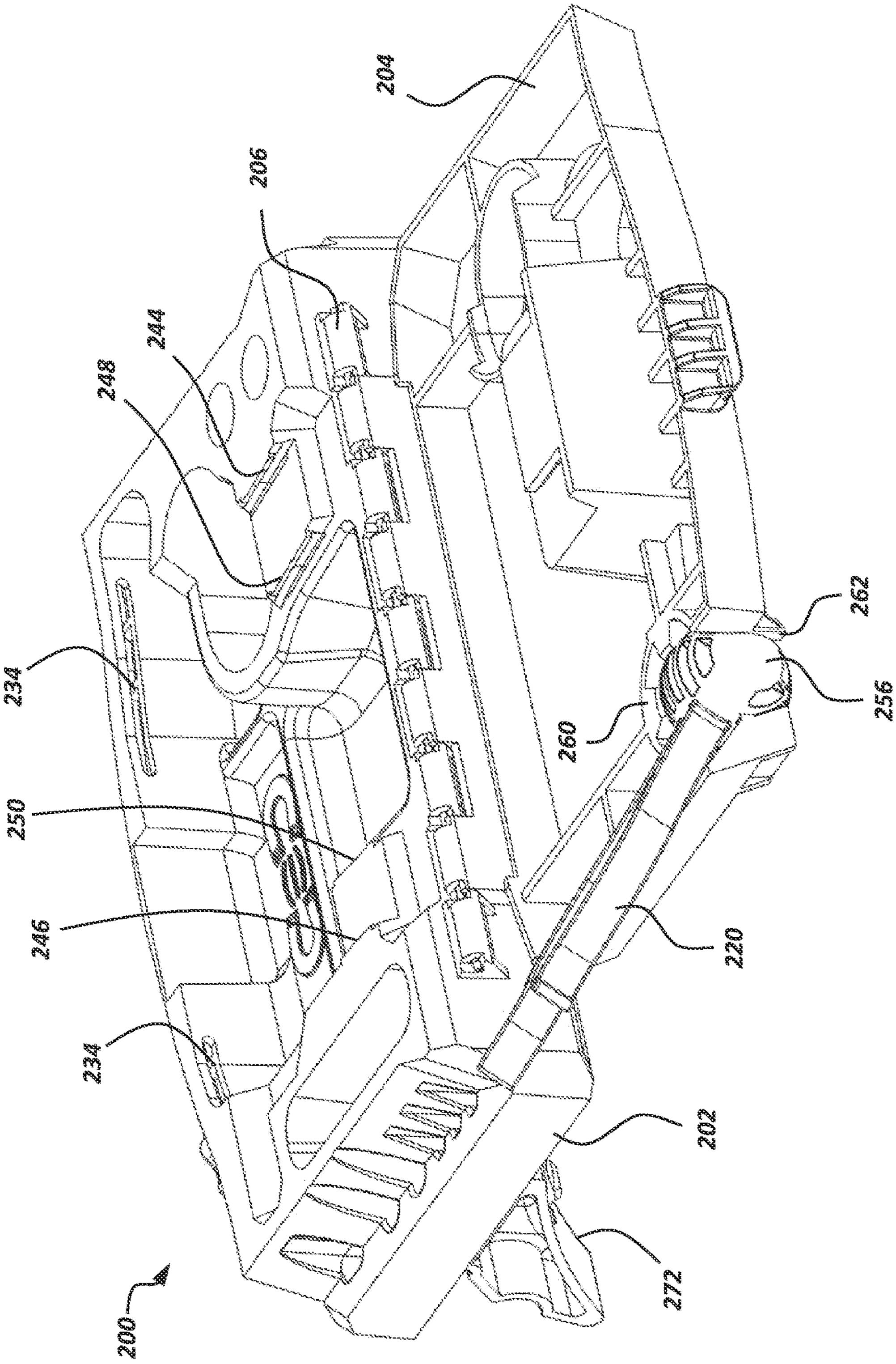
FIG. 24 is a perspective view of the top cap of FIG. 16 in an opened configuration from the rear end.
Figure 25:
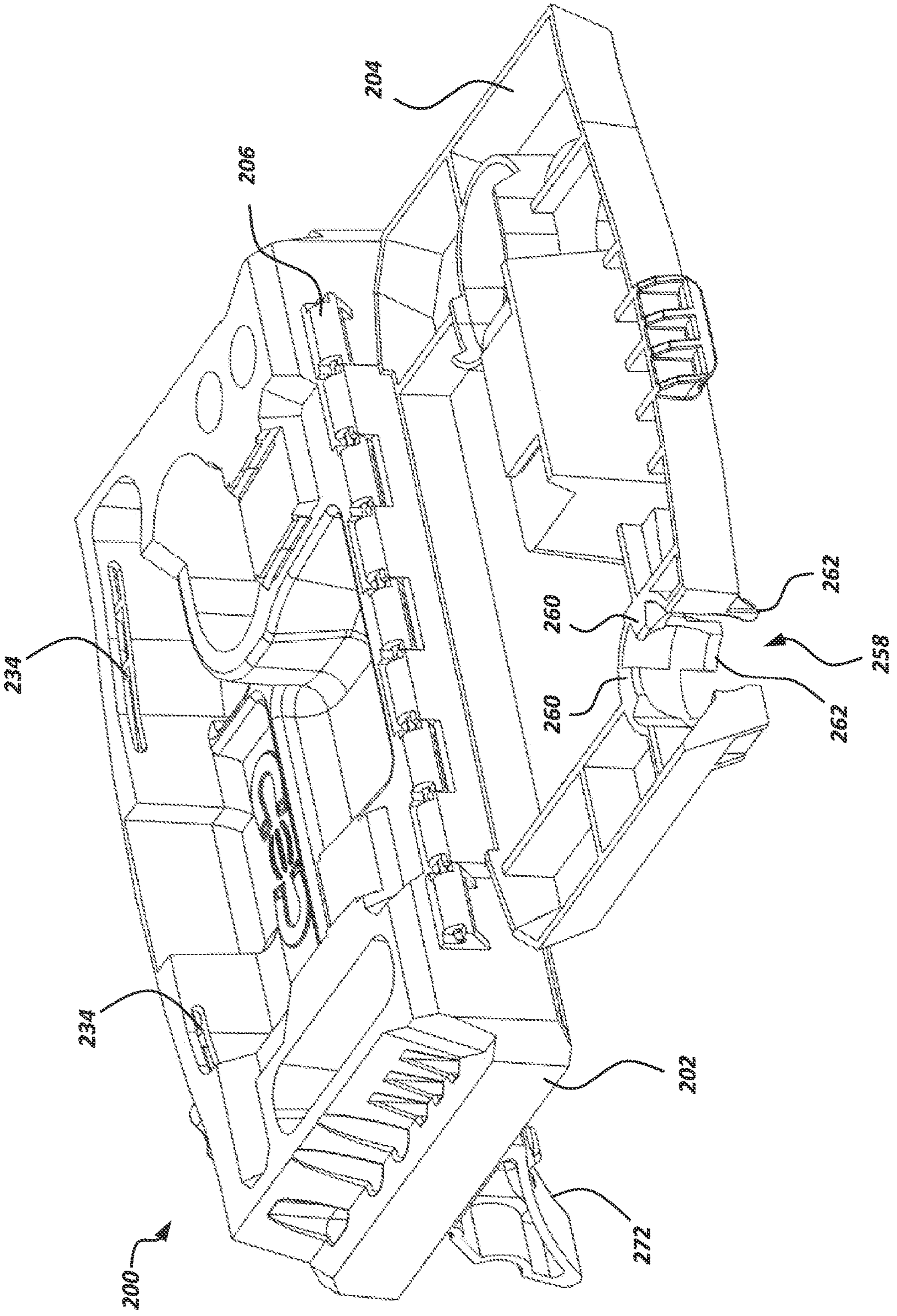
FIG. 25 is a perspective view showing the top cap of FIG. 24 with a clamp accessory removed.
Figure 26:
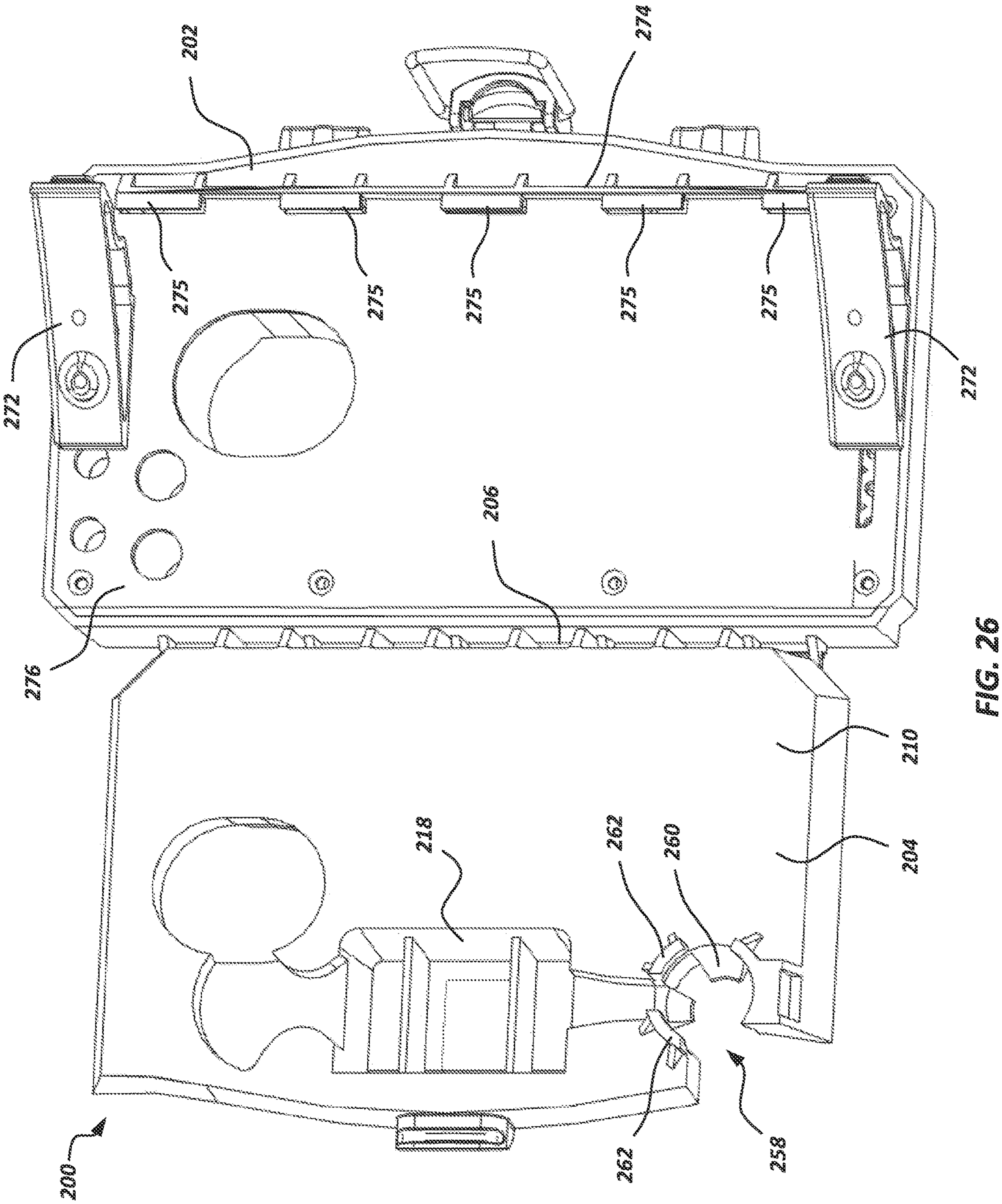
FIG. 26 is a bottom perspective view of the top cap of FIG. 24 with the clamp accessory removed.
Figure 27:
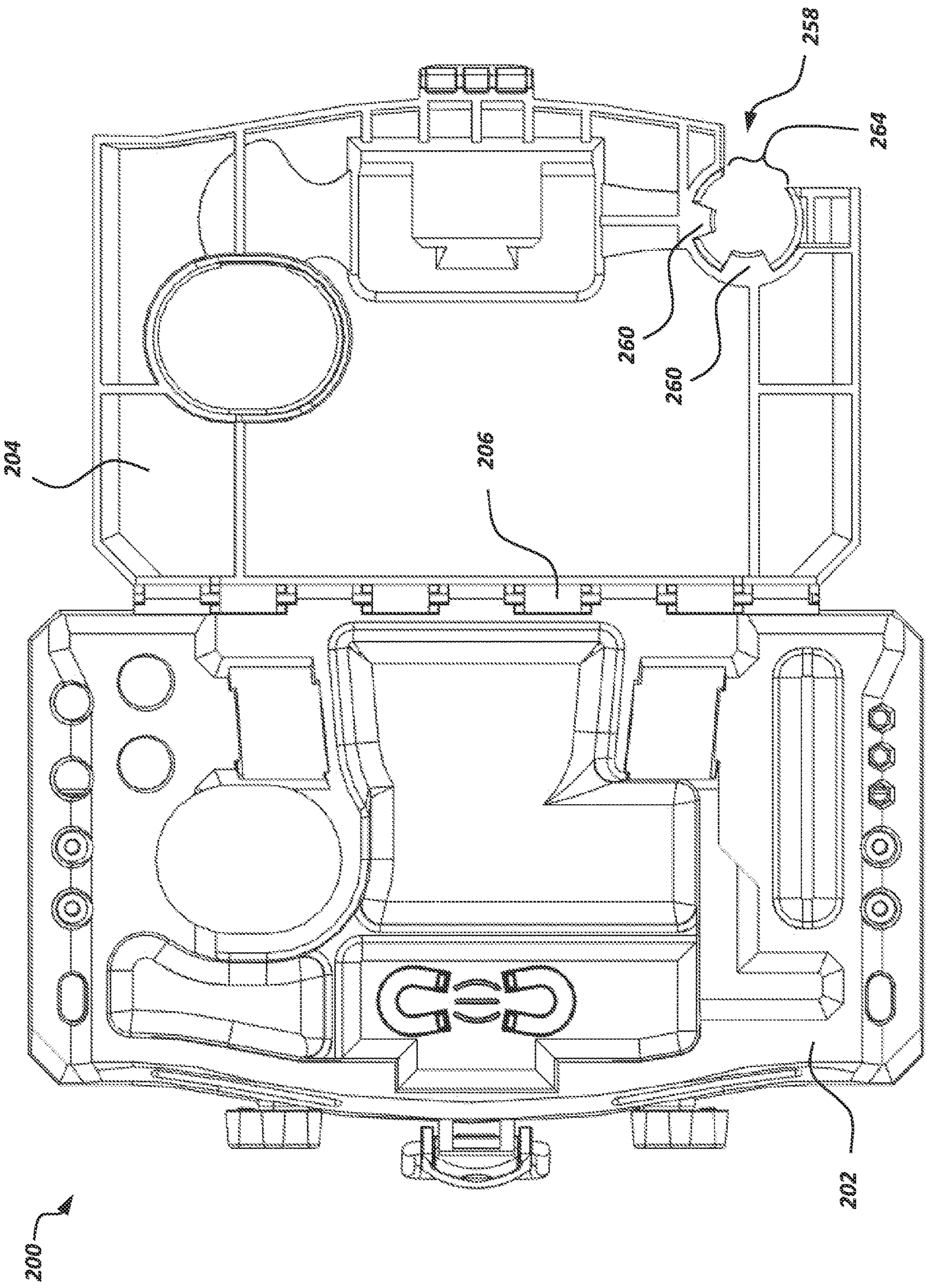
FIG. 27 is a top view of the top cap of FIG. 24 with the clamp accessory removed.

In the closed configuration, the body portions 202, 204 can provide a working surface, tray, or other support area for a user of the ladder 100. The second body portion 204 can have an upward-facing tray surface 210 that is flat and substantially horizontal relative to a gravitational direction. In other words, the tray surface 210 can be oriented substantially parallel to a top surface of the rung 106 or the lower surface 276 of the first body portion 202. The tray surface 210 also faces in an opposite direction as compared to the lower surface 276. The second body portion 204 can have a narrower lateral width as compared to the first body portion 202, as shown in FIGS. 18-19 and 23, thereby allowing the user to use the tool openings (e.g., 212 in FIG. 18) in the sides of the first body portion 202 while in the closed configuration.

The body portions 202, 204 can also each include a through-hole 214, 216 (see FIGS. 16, 18, 20, 21, and 23). The through-holes 214, 216 can be aligned with each other to form a collective channel when the body portions 202, 204 are in the closed configuration. Their alignment can therefore form an elongated through-hole that extends through both body portions 202, 204. The elongated hole can receive thick- or long-handled tools (e.g., a hammer or paintbrush) while in the closed configuration. The aligned location of the through-holes 214, 216 can be substantially centered along the width of the top cap 200. Positioning the through-holes 214, 216 near the center can allow the ladder 100 to convert from the step-ladder configuration (e.g., FIG. 1) to the collapsed position (e.g., FIG. 15) without the rear rungs (e.g., 118) coming into contact with a handle or other portion of a tool extending through the bottom of the first body portion through-hole 216. Rotation of a rear rung 118 about the hinges 126 would otherwise cause contact with a handle if the through-holes 214, 216 were positioned rearward on the top cap 200 (i.e., nearer to the hinge 206), and the handle would not be able to extend through the through-holes 214, 216 if they were aligned closer to the front inner rung 106. Thus, the through-holes 214, 216 can be centrally positioned between the front and rear sides of the top cap 200 (i.e., centrally on an axis of the top cap 200 that extends perpendicular and horizontally relative to the hinge 206).

In the closed configuration, the second body portion 204 can also retain tools, fasteners, or other objects in an upward-facing recess 218 in the tray surface 210. See FIGS. 16, 18, and 26. In some embodiments, a rotatable accessory 220 (e.g., a clamp or other holding or gripping device) is mounted to the second body portion 204, and it can be at least partially held within the recess 218 when in a rotatable accessory storage configuration. See FIGS. 16-19. The recess 218 can include a molded shape (e.g., narrowed and curved walls adjacent to flared walls) configured to friction fit or snap fit with portions of the rotatable accessory 220 to help it stay in the storage configuration until it is deployed by the user and to help it stay stationary in a deployed position out of the recess 218 when desired. A compartment or sub-recess can be located at the bottom of the recess 218 below the rotatable accessory 220 while the rotatable accessory 220 is in the storage configuration for additional item retention. The rotatable accessory 220 can help hold items within that compartment by at least partially covering the opening over the compartment.

The latch 208 can comprise a rigid loop portion configured to wrap around a portion (e.g., a hook or protrusion) of the second body portion 204 and to keep the second body portion 204 from rotating relative to the first body portion 202 (i.e., keeping the body portions 202, 204 in the closed or storage configuration). In various other configurations, other types of latches can be used, such as ones comprising at least one elastic strap, interlocking pivotable parts, hook-and loop fastener, or a snap-fit between the body portions 202, 204.

Figure 21:
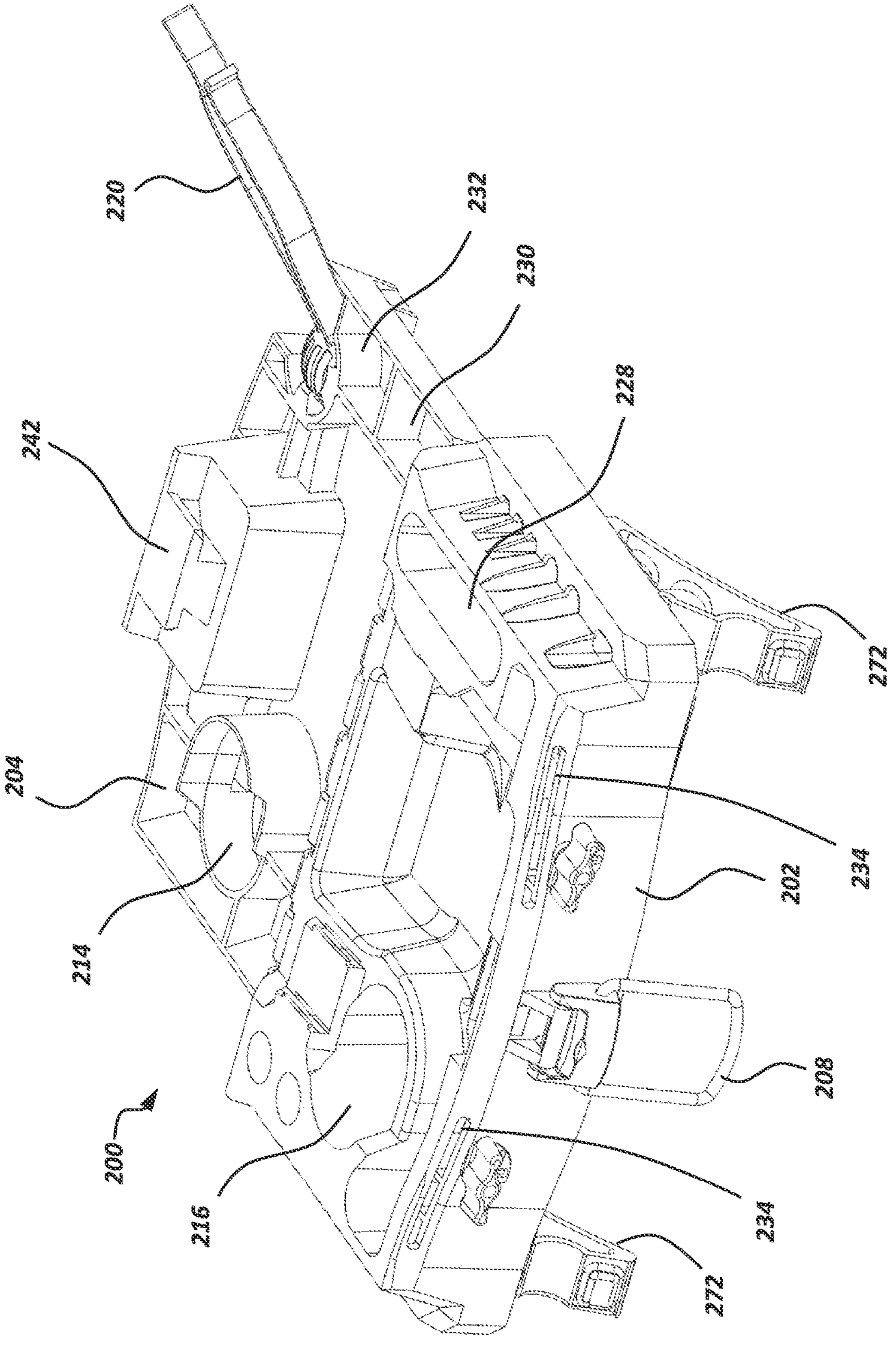
FIG. 21 is a perspective view of the top cap of FIG. 16 in an opened configuration.
Figure 22:
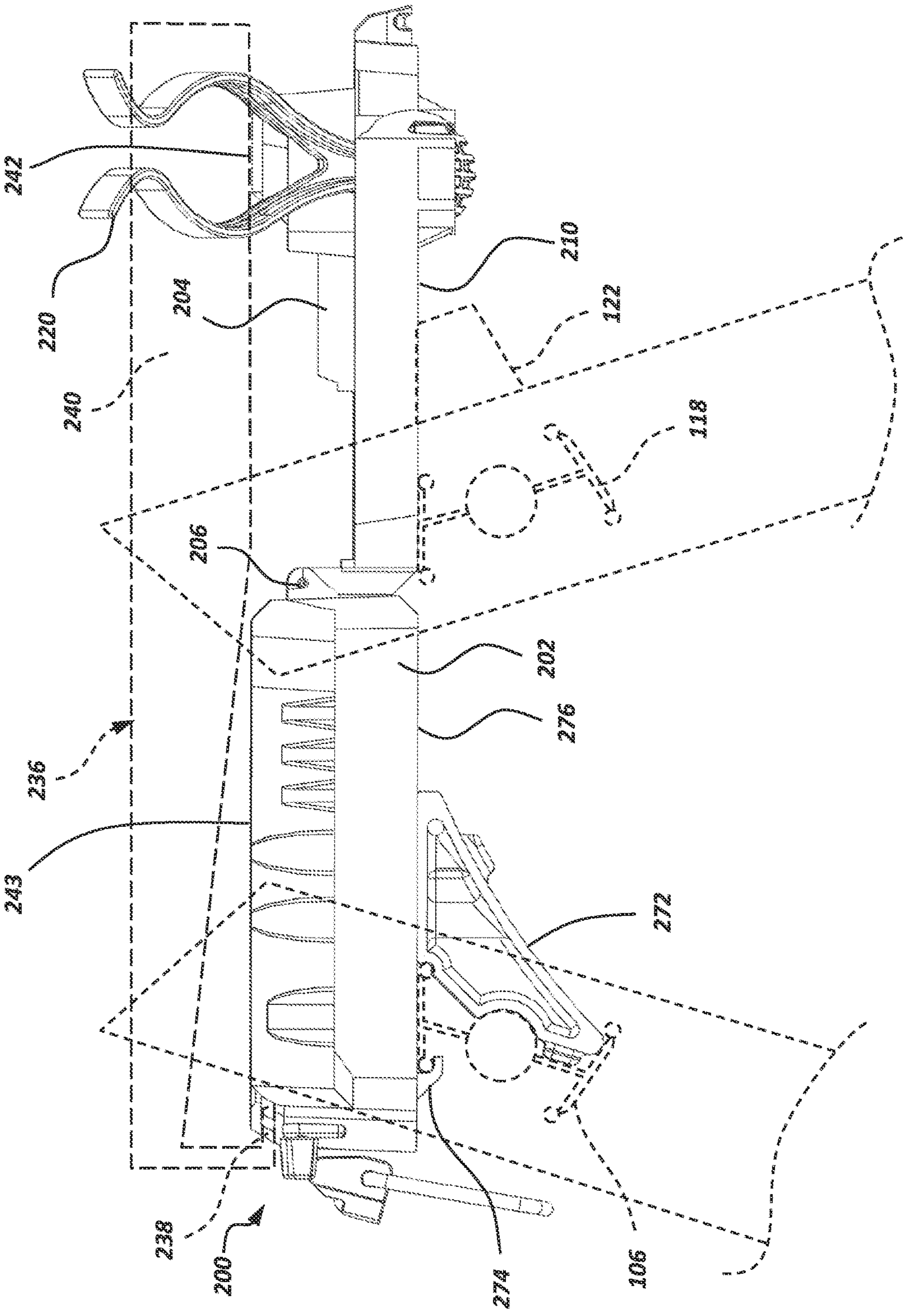
FIG. 22 is a side view of the top cap of FIG. 16 in an opened configuration with an accessory and ladder rails and rungs shown in broken lines.

When the latch 208 is released, the second body portion 204 is capable of rotating about the hinge 206 from the closed configuration to the open configuration (e.g., the configuration shown in FIGS. 21-24). Rotation of the second body portion 204 can invert the direction in which the tray surface 210 faces, thereby rotating the tray surface 210 to face downward and parallel to the lower surface 276 of the first body portion 202. In some embodiments, the tray surface 210 and lower surface 276 are coplanar. See FIG. 22. While in the open configuration, the second body portion 204 can come into contact with one or more rear rungs (e.g., rear inner rung 118 and/or rear outer rung 122), as shown in FIG. 22. The rear rung(s) 118, 122 can provide support for the tray surface 210 of the second body portion 204, thereby enhancing the stability and weight-bearing capacity of the second body portion 204 while in the open configuration.

In some embodiments, the rear rung(s) 118, 122 do not contact the second body portion 204 (e.g., the second body portion 204 is suspended above the top surfaces of the rungs 118, 122), in which case the hinge 206 can support the second body portion 204 as the respective rear surfaces 222, 224 (see FIG. 17) of the first and second body portions 202, 204 abut and contact each other. In that case, both the first and second body portions 202, 204 can be referred to as extending in a cantilevered manner from the front inner rung 106 since they only contact the front inner rung 106 and extend horizontally away from the front inner rung 106 without additional underbody or suspension support.

The first and second body portions 202, 204 can form one or more internal cavities or sets of corresponding recesses that allow items to be stored within the top cap 200 while in the closed configuration. For example, as shown in FIGS. 21 and 23, a first recess 228 in the first body portion 202 can be aligned with a second recess 230 in the second body portion 204 so that when the top cap 200 is closed, items that protrude from the first recess 228 can be at least partially received in the second recess 230 rather than preventing closure of the top cap 200. When the top cap 200 is open, the recesses 228, 230 can each individually hold items. The perimeters of the sidewalls of the recesses 228, 230 can beneficially be closed perimeters that are centered on length axes of the recesses 228, 230 so that the chamber(s) formed upon closure of the top cap 200. Thus, the mouth edge(s) of one or more recesses 230, 232 can face or surround the mouth edge of another recess 228 and can form a closed cavity (while the top cap 200 is closed) to block items from falling out of their combined chamber. The chambers can therefore retain, secure, and carry items while the ladder 100 is turned sideways or the top cap 200 is inverted (e.g., in the configuration of FIG. 12).

The top cap 200 can also include a set of aligned horizontal slots 234 extending through a sidewall of the first body portion 202 and which are configured to help support an additional accessory (e.g., accessory 236 shown schematically in FIG. 22) having a set of ridges, tabs, legs, or protrusions 238 insertable into the slots 234. For example, the slots 234 can receive protrusions 238 of the accessory while another portion 240 (e.g., an oppositely-positioned reservoir end) of the accessory 236 is supported on top of the first or second body portion 202, 204. In FIG. 22, the accessory 236 is supported by the second body portion 204 on the underside surface 242 of recess 218. A paint roller tray is a common accessory having hook-like protrusions with end shapes arranged as two aligned ridges that would be insertable into the horizontal slots 234 while another tray portion of the paint roller tray is supported on top of one of the body portions 202, 204.

Figure 28:
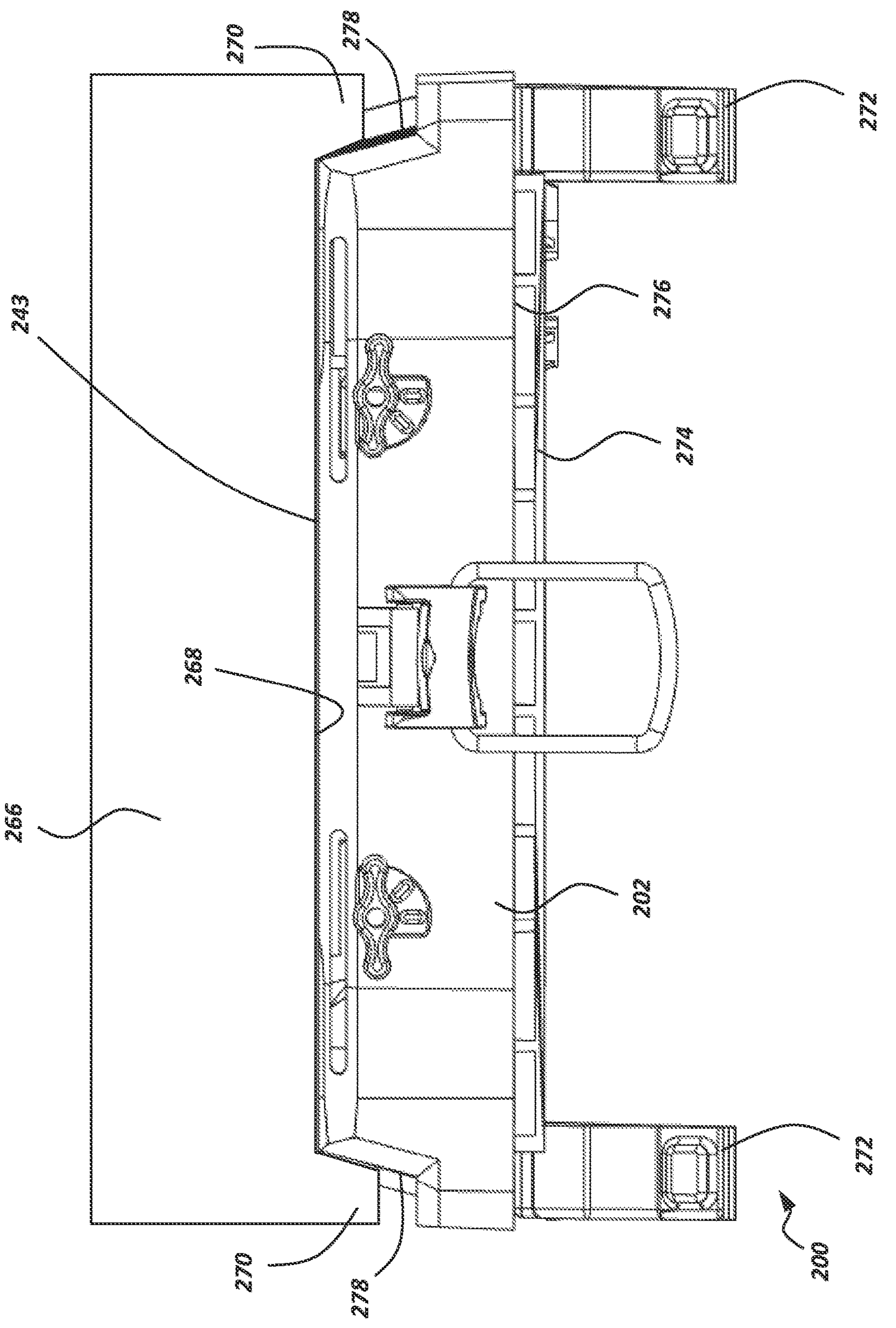
FIG. 28 is a front view of the top cap of FIG. 16 with an accessory positioned on the first body portion.

In some embodiments, the accessory can include a tool box or other container having a closeable internal cavity. The accessory can have ridges, tabs, or protrusions (e g, similar to ridges 238) to mount into the horizontal slots 234 to help keep it stable on the top cap 200. In some embodiments, an accessory 266 (see FIG. 28) can include a tray or box having a flat bottom surface 268 configured to be supported by top surfaces (i.e., 242, 243) of the top cap 200 which are in a common horizontal plane when the top cap 200 is in the open configuration. See also FIG. 22. In some embodiments, the accessory 266 can also include one or more side protrusions 270 projecting downward relative to the bottom surface 268. The protrusions 270 can have inward-facing surfaces that face, engage, or abut outward-facing surfaces 278 of the first body portion 202 (and potentially also the second body portion 204), as shown in FIG. 28. The corresponding surfaces of the protrusions 270 and the outward-facing surfaces 278 can be sloped to ease the positioning of the accessory 266 onto the top surface 243 of the top cap 200. By engaging the outward-facing surfaces 278, the protrusions 270 can limit lateral motion of the accessory 266 relative to the top cap 200 and can thereby help keep the accessory 266 from falling off of the top cap 200. In some embodiments, the outward-facing surfaces 278 can be positioned inward relative to the positions shown in FIG. 28, such as by being positioned within a recess (e.g., 228, 230, and/or 232) of the first or second body portion.

The top cap 200 can also include one or more set of protrusions or overhanging ridges 244, 246, 248, 250 configured to retain a lip portion of a can or other receptacle. See FIG. 24. Examples of features such as these are described in U.S. patent application Ser. No. 17/495,374 entitled "TOP CAP AND ACCESSORY TRAY FOR LADDERS AND LADDERS INCORPORATING SAME," filed 6 Oct. 2021, the disclosure of which is incorporated by reference herein in its entirety.

One pair of the overhanging ridges 244, 246 can be positioned further apart and at a different vertical level (i.e., in a different vertically-spaced apart plane) as compared to another pair of ridges 248, 250 (which are at a lower vertical plane that is parallel to the upper level). The upper pair of ridges 244, 246 can receive a first size (e.g., large) can, cup, or other receptacle by receiving a bottom lip or underside protrusion of the receptacle. An example can 252 is shown schematically in FIG. 23 (in broken lines). Paint cans, such as a gallon-size paint can (or other size), commonly have a bottom lip around their base circumference that can be inserted into a recessed area located underneath each of the ridges 244, 246 and can thereby be retained to the top cap 200 on the first body portion 202 in a manner limiting or preventing tipping or spilling from the paint can. The base lip circumference 254 of the can 252 is shown as the outer diameter in FIG. 23, and a main body circumference of the can 252 is shown within the base lip circumference 254. In a similar manner, the lower pair of ridges 248, 250 can be used to retain a smaller can, such as a quart-size paint can (or other size) having an appropriately-sized, smaller-diameter, bottom lip. FIG. 23 shows that the ridges 244, 246, 248, 250 can have a tapered (or curved) top profile that can help limit the amount of insertion of the receptacle into the ridge-retaining area of the top cap so that the can 252 does not slide all the way through the ridges 244, 246 when inserted from the hinge-side of the top cap 200. Thus, each pair of ridges can be arranged at widths configured to retain a common size of paint can, cup, or similar receptacle.

Figure 16:
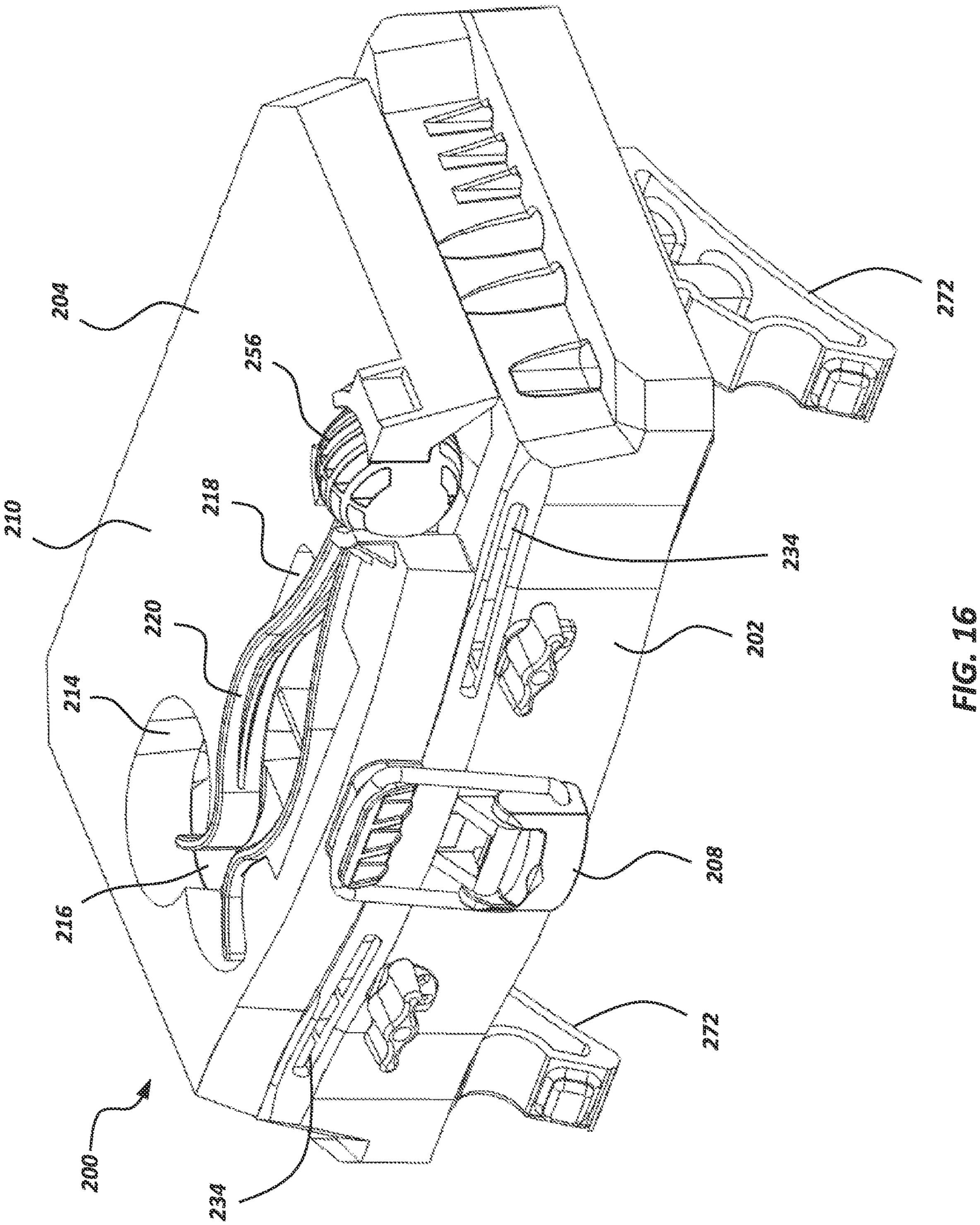
FIG. 16 is a perspective view of a top cap.
Figure 17:
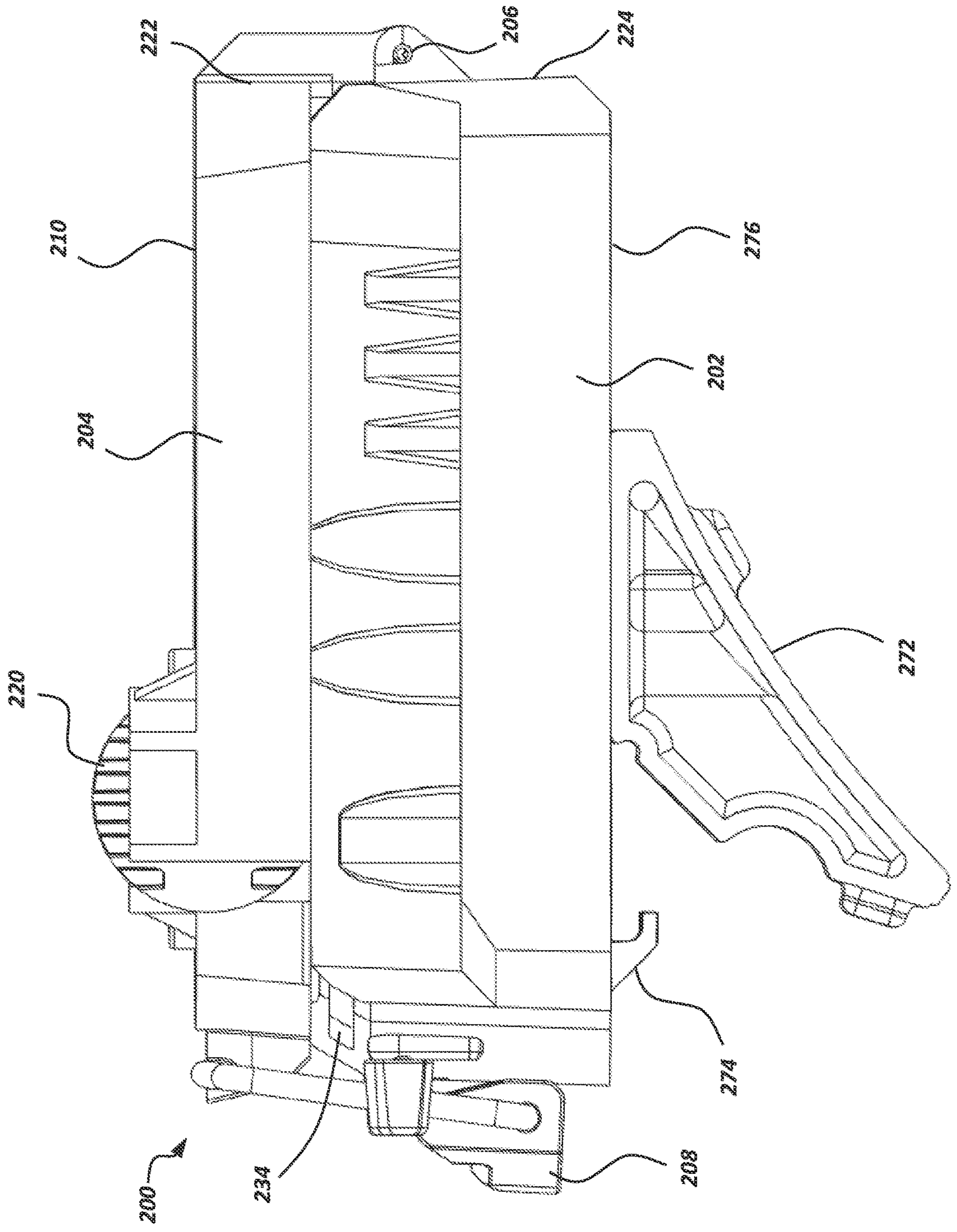
FIG. 17 is a right side view of the top cap of FIG. 16.

In some embodiments, a rotatable accessory 220 (e.g., a clamp) is rotatably mounted to the top cap 200. In top cap 200, the rotatable accessory 220 includes a spherical portion 256 (i.e., a ball-shaped end portion) configured to slidably mount to a spherical cavity 258 formed by the second body portion 204 and a second portion (e.g., an arm portion, hook, rod member, flat plate, or other elongated portion extending from the spherical portion 256). The spherical cavity 258 can include a set of protrusions 260, 262 (see FIGS. 23-27) configured to hold the spherical portion 256 of the rotatable accessory 220 in place while also allowing the rotatable accessory 220 to rotate about a center point of the spherical portion 256 without falling out of the cavity 258. Accordingly, the rotatable accessory 220 can rotate in place between a storage position in the recess 218 (i.e., on an outward-facing portion of the top cap 200 on the second body portion 204), as shown in FIG. 16, and a deployed position extending from the cavity 258, as shown in FIG. 21. In order to do so, the arms of the rotatable accessory 220 can rotate through an open side 264 of the cavity 258 (see FIGS. 23 and 27, i.e., where the spherical portion 256 is exposed in FIG. 16). Therefore, an arm portion or clamping portion of the rotatable accessory 220 can rotate from a first side of the second body portion 204 to a second side of the second body portion 204 by rotating through a plane separating the first and two sides of the second body portion 204. In some configurations, the spherical portion 256 of the rotatable accessory 220 can be frictionally fit in the cavity 258 by one or more of the protrusions 260, 262 so that the arms of the rotatable accessory 220 remain in a user-defined rotated position after the rotatable accessory 220 is manipulated by the user. In some embodiments, the arms of the rotatable accessory 220 can be elastically flexible and thereby configured to hold (e.g., pinch or clamp) items between the arms such as, for example, paper towels, rags, tools, or other objects. Thus, the friction fit of the rotatable accessory 220 can, in some embodiments, be configured to hold a low weight (e.g., less than 2 pounds) to retain such items while still being able to rotate under a low amount of input torque provided by the user when the user decides to reposition the rotatable accessory 220. Alternatively, the rotatable accessory 220 can be configured to fit more tightly within the cavity 258 to hold higher weight or to be more rigid after repositioning. A set screw or similar adjustable fixing member or clamping element (not shown) can extend into contact with the spherical portion 256 through the main body of the top cap 200 and can be adjustable by a user to selectively limit or ease rotation of the spherical portion 256 as desired. Thus, the rotatable accessory 220 can hold different amounts of weights (e.g., greater than 2 pounds) based on how firmly it is secured in place within the cavity 258. The rotatable accessory 220 is also mounted to a moving part of the top cap 200, i.e., the second body portion 204. In other words, the rotatable accessory 220 is an accessory to the top cap 200 that moves relative to the rung 106 on a portion of the top cap 200 that is also configured to move relative to the rung 106. In some configurations, the rotatable accessory 220 can be mounted to a non-moving top cap, such as top cap 150, which is configured to stay stationary relative to the top rung 106 and its associated inner rails 104. Thus, top cap 150 can be configured with a spherically-shaped cavity 258 (e.g., with protrusions 260, 262) to receive the rotatable accessory 220. Furthermore, the rotatable accessory 220 and cavity 258 can be incorporated into a body of a top cap of a step ladder wherein the top cap extends across and between hinges at the top of the ladder, such as the top cap shown in U.S. Pat. No. 10,597,941, which was filed 25 Sep. 2014 and entitled, "STEP LADDERS, COMPONENTS FOR STEP LADDERS AND RELATED METHODS," the entire disclosure of which is hereby incorporated by reference. Additionally, the rotatable accessory 220 and cavity 258 can be incorporated into a body of a top cap of a ladder wherein the top cap extends across and between terminal top ends of a pair of rails of the ladder, such as the top cap shown in U.S. Patent Application Publication No. 2019/0376341, which was filed 7 Jun. 2019 and entitled, "COMBINATION LADDERS, LADDER COMPONENTS AND RELATED METHODS," the entire disclosure of which is hereby incorporated by reference. Thus, the rotatable accessory 220 can be incorporated into various top cap types and configurations and not just in a removable or separable top cap for an articulating ladder.

In some embodiments, the hinge 206 can be a barrel hinge, interlocking rotatable parts, living hinge (i.e., flexible connector), related structure, or similar structure. The hinge 206 can extend across substantially the entire width of at least the second body portion 204 in a manner providing improved durability and reliability to the hinge 206.

Figure 29B:
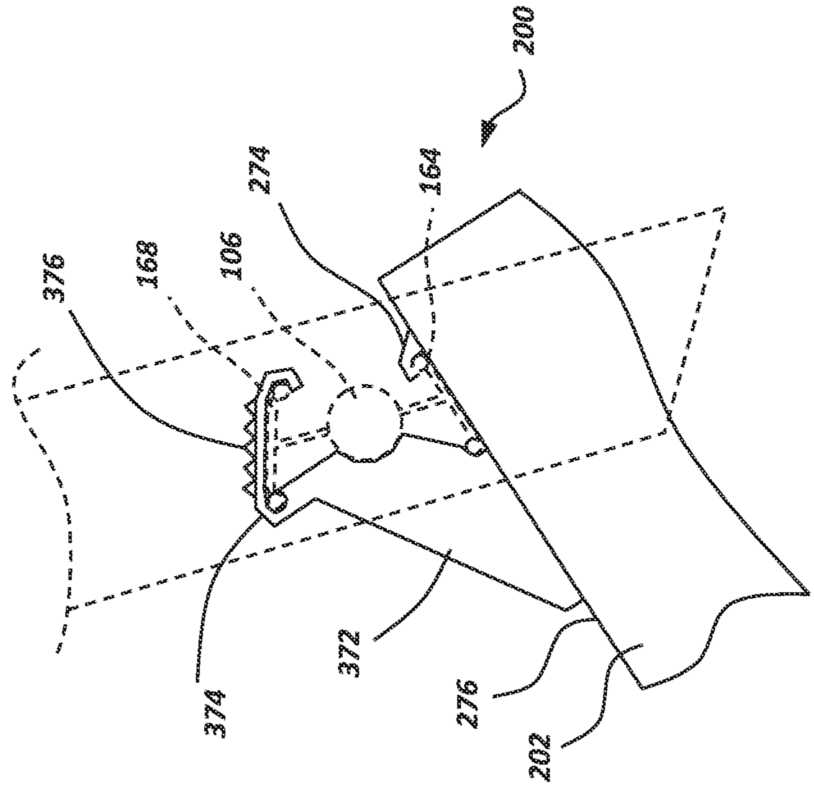
FIG. 29B shows a side view of the top cap of FIG. 29A in a straight ladder configuration.
Figure 29A:
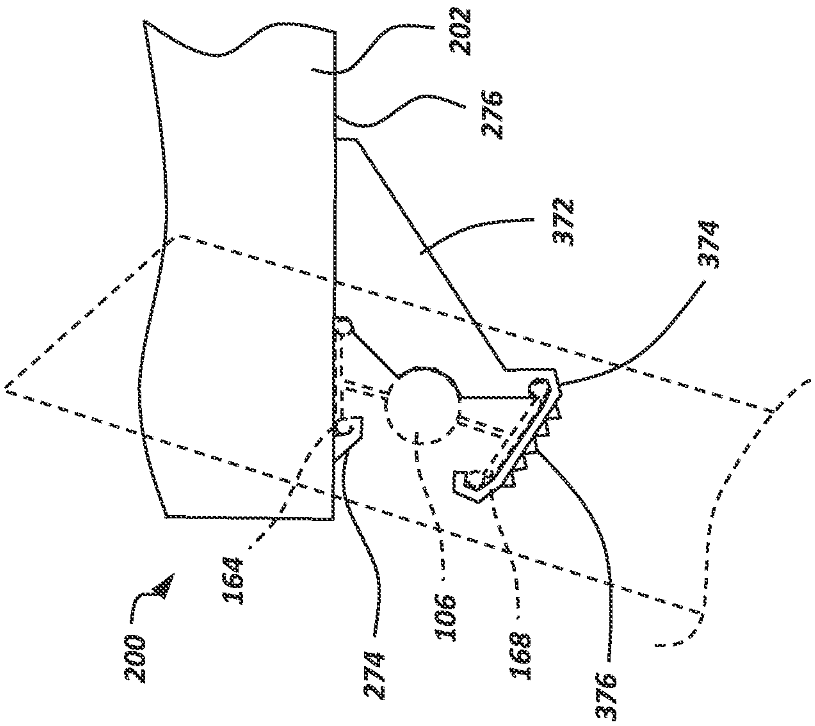
FIG. 29A shows a side view of a top cap mounted to a rung and rail, which are shown in broken lines, in a step ladder configuration.

The bracket members 272 can comprise the features and functionality of brackets 172 described elsewhere herein. Thus, two bracket members 272 can be used to clamp the top cap 200 to the inner rung 106 of the ladder 100. The bracket members 272 can extend only over the first tread portion 164 and between the first and second tread portions 164, 168 so as to leave the second tread portion 168 uncovered and open. FIGS. 29A-29B show a version of a bracket member 372 of a related top cap 300 that can cover the second tread portion 168 of the inner rung 106. The bracket member 372 includes a tread-engaging portion 374 that extends over the foot-engaging surface of the second tread portion 168, thereby substantially covering and replacing the surface on which the user steps when climbing the rung 106 when the rung 106 is in the straight ladder configuration (as shown in FIG. 29B). To preserve tread performance, durability, and friction characteristics, the tread-engaging portion 374 can include a block or plurality of inserts 376 having a different material composition as compared to the rest of the bracket member 372. For example, the bracket member 372 can comprise a plastic or polymer material, and the tread-engaging portion 374 can comprise inserts 376 using metal or composite material (e.g., aluminum) with superior durability to the plastic or polymer material. The tread-engaging portion 374 and/or inserts 376 can extend across all or substantially all of the foot-engageable width of the rung 106 to provide a consistent texture and other surface properties for the entire rung 106. Furthermore, in some embodiments, the tread-engaging portion 374 can comprise a flexible material (e.g., rubber or flexible polymer (e.g., thermoplastic polyurethane)) that can be bent or peeled away from the second tread portion 168 to release the top cap 200 from the rung 106 when needed.

While the invention may be susceptible to various modifications and alternative forms, specific embodiments have been shown by way of example in the drawings and have been described in detail herein. However, any features or components of a given embodiment may be combined, without limitation, with features or components of any other described embodiment. Additionally, it should be understood that the invention is not intended to be limited to the particular forms disclosed. Rather, the invention includes all modifications, equivalents, and alternatives falling within the spirit and scope of the invention as defined by the following appended claims.

What is claimed is:

1. A ladder, comprising:

a first rail assembly comprising:

a first pair of inner rails and a first pair of outer rails, the first pair of inner rails being slidably disposed in an upper portion of the first pair of outer rails;

a first plurality of inner rungs coupled between the first pair of inner rails, wherein an uppermost rung of the first plurality of inner rungs comprises:

a central body portion;

a substantially flat first tread portion extending outward from the central body portion; and a substantially flat second tread portion extending outward from the central body portion opposite the substantially flat first tread portion; and a first plurality of outer rungs coupled between the first pair of outer rails;

a second rail assembly hingedly coupled with the first rail assembly and comprising:

a second pair of inner rails and a second pair of outer rails, the second pair of inner rails being slidably disposed in an upper portion of the second pair of outer rails;

a second plurality of inner rungs coupled between the second pair of inner rails; and a second plurality of outer rungs coupled between the second pair of outer rails; and a top cap cantilevered from the uppermost rung of the first plurality of inner rungs;

wherein, when the first rail assembly is in a first position relative to the second rail assembly, the top cap covers the substantially flat first tread portion of the uppermost rung and the substantially flat second tread portion is positioned below the substantially flat first tread portion; and wherein, when the first rail assembly is in a second position relative to the second rail assembly, the substantially flat second tread portion is positioned above the substantially flat first tread portion and is exposed for a user to step on.

2. The ladder of claim 1, wherein the top cap includes a main body and at least one bracket coupled with the main body.

3. The ladder of claim 2, wherein the main body includes a protrusion defining a first groove, and a first edge of the uppermost rung is positioned within the first groove.

4. The ladder of claim 3, wherein the at least one bracket defines a second groove, and a second edge of the uppermost rung is positioned within the second groove.

5. The ladder of claim 2, wherein a portion of the at least one bracket abuts against the central body portion of the uppermost rung.

6. The ladder of claim 1, wherein the the top cap is clamped to the flat first tread portion.

7. The ladder of claim 1, wherein the first rail assembly and the second rail assembly are selectively lockable in at least three different positions relative to each other.

8. The ladder of claim 1, wherein the first rail assembly and the second rail assembly are selectively movable between a collapsed position and a step ladder position, and a gap is defined between a cantilevered edge of the top cap and an uppermost rung of the second plurality of inner rungs when the first and second rail assemblies are in the step ladder position.

9. The ladder of claim 1, wherein the first rail assembly and the second rail assembly are selectively movable between a collapsed position and a step ladder position, and wherein, when the ladder is in the collapsed position, the top cap is positioned between a first plane extending through face surfaces of the first plurality of outer rungs and a second plane extending through face surfaces of the second plurality of outer rungs.

10. A ladder, comprising:

a first pair of rails, at least one rail of the first pair of rails having a base end and a top end;

a first plurality of rungs coupled between the first pair of rails;

a second pair of rails, at least one rail of the second pair of rails having a top end, the top end being pivotally joined to the top end of the at least one rail of the first pair of rails;

a second plurality of rungs coupled between the second pair of rails; and a tray mounted to a rung of the first plurality of rungs, wherein the rung comprises a first tread portion and a second tread portion positioned opposite the first tread portion such that the first tread portion extends outward from a central body portion of the rung and the second tread portion extends outward from the central body portion of the rung, the tray being directly mounted to the first tread portion, and the tray is positioned between the base end and the top end of the at least one rail of the first pair of rails;

wherein:

in a first ladder position, the first tread portion is positioned above the second tread portion; and in a second ladder position, the second tread portion is positioned above the first tread portion, and the second tread portion is exposed for a user to step on.

11. The ladder of claim 10, wherein the tray is positioned out of contact with all other rungs of the first plurality of rungs and the second plurality of rungs.

12. The ladder of claim 10, further comprising at least one hinge joining at least one of the first pair of rails to at least one of the second pair of rails, wherein the rung is positioned nearest to the at least one hinge of all of the first plurality of rungs.

13. The ladder of claim 10, wherein the tray is reversibly releasable from the rung.

14. The ladder of claim 10, wherein the rung includes a first tread surface, wherein the tray has a lower surface contacting the first tread surface.

15. A ladder accessory, comprising:

a first body portion having an upper surface, a lower surface, and a protrusion extending from the lower surface;

a bracket member coupled with the first body portion and extending away from the lower surface of the first body portion, the bracket member being at least partially repositionable relative to the first body portion;

wherein a first recess opening is at least partially defined by the protrusion and the lower surface of the first body portion, and the first recess opening opens in a first direction oriented substantially parallel to the lower surface and rearward toward the bracket member;

wherein a second recess opening is at least partially defined by the bracket member and opens in a second direction oriented substantially parallel to the lower surface and facing forward toward the protrusion.

16. The ladder accessory of claim 15, wherein the protrusion defines a bottom wall of the first recess opening, and the bracket member defines a bottom wall of the second recess opening.

17. The ladder accessory of claim 15, wherein the bracket member is reversibly releasable from the first body portion.

18. The ladder accessory of claim 17, wherein the bracket member is attached to the first body portion using a reversibly releasable fastener.

19. The ladder accessory of claim 15, further comprising a second body portion pivotally mounted to the first body portion and movable between a first position covering the upper surface of the first body portion and a second position extending away from the upper surface of the first body portion.

20. The ladder accessory of claim 19, wherein the first body portion comprises a first aperture extending through the upper and lower surfaces, and a second aperture extends through the second body portion and forms a channel through the ladder accessory when the second body portion is in the first position.

21. The ladder accessory of claim 15, wherein the first recess opening and the second recess opening are configured to receive a longitudinal length of a rung, wherein the first direction and the second direction are configured to be oriented perpendicular to the longitudinal length.

* * * * *